United States Patent
Grayson et al.

(10) Patent No.: US 9,781,695 B2
(45) Date of Patent: Oct. 3, 2017

(54) SYSTEMS, METHODS AND MEDIA FOR SMALL CELL IDLE MODE MOBILITY

(71) Applicant: CISCO TECHNOLOGY, INC., San Jose, CA (US)

(72) Inventors: Mark Grayson, Maidenhead (GB); Anton Okmyanskiy, Vancouver (CA); Mickael James Graham, Bellevue Hill (AU); Mansoorali Naushadali Kudsi, Pune (IN)

(73) Assignee: Cisco Technology, Inc., San Jose, CA (US)

( * ) Notice: Subject to any disclaimer, the term of this patent is extended or adjusted under 35 U.S.C. 154(b) by 91 days.

(21) Appl. No.: 14/975,929

(22) Filed: Dec. 21, 2015

(65) Prior Publication Data
US 2016/0105865 A1    Apr. 14, 2016

Related U.S. Application Data

(63) Continuation of application No. 14/088,536, filed on Nov. 25, 2013, now Pat. No. 9,226,255.

(51) Int. Cl.
*H04W 4/00* (2009.01)
*H04W 60/02* (2009.01)
(Continued)

(52) U.S. Cl.
CPC ........... *H04W 60/02* (2013.01); *H04W 4/025* (2013.01); *H04W 8/06* (2013.01); *H04W 68/06* (2013.01);
(Continued)

(58) Field of Classification Search
CPC ........ H04W 60/02; H04W 8/06; H04W 68/06
USPC ...................................... 455/435.1; 370/338
See application file for complete search history.

(56) References Cited

U.S. PATENT DOCUMENTS 9,226,255 B2    12/2015  Grayson et al.
2009/0156213 A1*  6/2009  Spinelli ............... H04W 92/02
                                                      455/436
(Continued)

FOREIGN PATENT DOCUMENTS

CN    104661267    5/2015
EP     2876948    5/2015
(Continued)

OTHER PUBLICATIONS

EPO Mar. 31, 2015 Extended Search Report and Written Opinion from European Application No. 14183615.

(Continued)

*Primary Examiner* — Marcos Batista
(74) *Attorney, Agent, or Firm* — Patterson + Sheridan, LLP

(57) ABSTRACT

Systems and methods for small cell idle mode mobility include receiving, at a first small cell of a preconfigured cluster of small cells, a mobility area update request from a user equipment (UE). The method can also include registering location information of the UE with a small cell gateway, and retrieving a core network periodic timer for the UE from a mobility server. If certain conditions are met, the first small cell forwards the mobility area update request to a core network via the small cell gateway. Otherwise, the method can include the first small cell updating the location information of the UE with the mobility server, generating a locally-generated mobility area update accept message, and sending a locally generated mobility area update accept message to the UE along with a local periodic timer instructing the UE to send another mobility area update request when the local periodic timer expires.

20 Claims, 19 Drawing Sheets

(51) Int. Cl.
  *H04W 8/06*    (2009.01)
  *H04W 68/06*   (2009.01)
  *H04W 4/02*    (2009.01)
  *H04W 84/04*   (2009.01)
  *H04W 88/00*   (2009.01)

(52) U.S. Cl.
  CPC ........ *H04W 84/045* (2013.01); *H04W 88/005* (2013.01)

(56) References Cited

U.S. PATENT DOCUMENTS

2014/0155078 A1* 6/2014 Balageas ............... H04W 24/02
                                                      455/452.1

2015/0148036 A1   5/2015 Grayson et al.

FOREIGN PATENT DOCUMENTS

WO    WO2009/139675    11/2009
WO    WO2013/110543    8/2013

OTHER PUBLICATIONS

Horn, Gavin, "3GPP Femtocells: Architecture and Protocols," Qualcomm Incorporated, San Diego, CA, Sep. 2010; 64 pages.
*3g Mobile Networks: Architecture, Protocols, and Procedures*, Sumit Kasera, et al., 1$^{st}$ Edition published Dec. 22, 2004, McGraw-Hill Professional XP055178132, ISBN 978-0-07-145101-7, pp. 298-304.

* cited by examiner

SYSTEMS, METHODS AND MEDIA FOR SMALL CELL IDLE MODE MOBILITY

RELATED APPLICATION

This application is a continuation (and claims the benefit of priority under 35 U.S.C. §120) of U.S. application Ser. No. 14/088,536, filed Nov. 25, 2013, entitled "SYSTEMS, METHODS AND MEDIA FOR SMALL CELL IDLE MODE MOBILITY," Inventors Mark Grayson, et al. The disclosure of the prior application is considered part of (and is incorporated in its entirety by reference in) the disclosure of this application.

FIELD OF THE DISCLOSURE

This disclosure relates generally to systems, methods, and media for idle mode mobility in small cells, such as femtocells.

BACKGROUND

Wireless networks are telecommunication networks that use radio waves to carry information from one node in the network to one or more receiving nodes in the network. Cellular telephony is characterized by the use of radio cells that provide radio coverage for a geographic area, with multiple cells arranged to provide contiguous radio coverage over a larger area. Wired communication can also be used in portions of a wireless network, such as between cells or access points.

Wireless communication technologies are used in connection with many user equipment, including, for example, satellite communications systems, portable digital assistants (PDAs), laptop computers, and mobile devices (e.g., cellular telephones). One benefit that users of such devices can obtain is the ability to connect to a network (e.g., the Internet) as long as the user is within range of such a wireless communication technology. Current wireless communication systems use either, or a combination of, circuit switching and packet switching in order to provide mobile data services to mobile devices. Generally speaking, with circuit-based approaches, wireless data is carried by a dedicated (and uninterrupted) connection between the sender and recipient of data using a physical switching path. Packet-based approaches, on the other hand, do not permanently assign transmission resources to a given session, and do not require the set-up and tear-down of physical connections between a sender and receiver of data. In general, a data flow in packet-based approaches is divided into separate segments of information or packets. The data flow may include a number of packets or a single packet.

One of the key characteristics of wireless communications systems is the ability to support efficient mobile devices. Generally these devices will be involved in wireless data transfer for a subset of time. In those periods between wireless data transfers, it can be beneficial to enable the device to enter a power saving state. In conventional cellular based wireless systems, this is called idle mode operation. One of the key capabilities of idle mode operation is for the network to be able to contact the mobile device, for example to deliver the alert for an incoming circuit switched telephone call or the delivery of one or more down-link packets destined to the mobile device.

In order to optimize idle mode operation, wireless systems can be defined with area codes. These area codes are signaled from the wireless communication system towards mobile devices operating in idle mode. The mobile devices can be configured to repeatedly receive the area code signaled from the system and to then signal the wireless communications system with the mobile device identity and the area code covering the device. Beneficially, the mobile device will only signal its identity and area code whenever the cell covering the mobile device is signaling an area code that is distinct from the when the last area code signaled by the device.

The flattened (i.e., no radio network controller (RNC)) Femto architecture together with small cell sizes can stress established idle mode mobility procedures. Standalone residential solutions are typically defined with distinct location area codes (LACs) and/or distinct routing area codes (RACs) which then trigger Home Node B Application Part (HNBAP) messaging (for UE registering) and Non-Access Stratum (NAS) messaging (for location updating) procedures whenever the UE changes its small cell point of attachment to the wireless communication system. There may also be distinct sets of LACs and/or RACs for Macro and HNB layers. However, applying the same autonomous operation to broader small-cell-deployments may be challenging because of higher mobility that can lead to more frequent HNBAP and NAS signaling procedures.

DESCRIPTION OF EXAMPLE EMBODIMENTS

Overview

Figure 1:
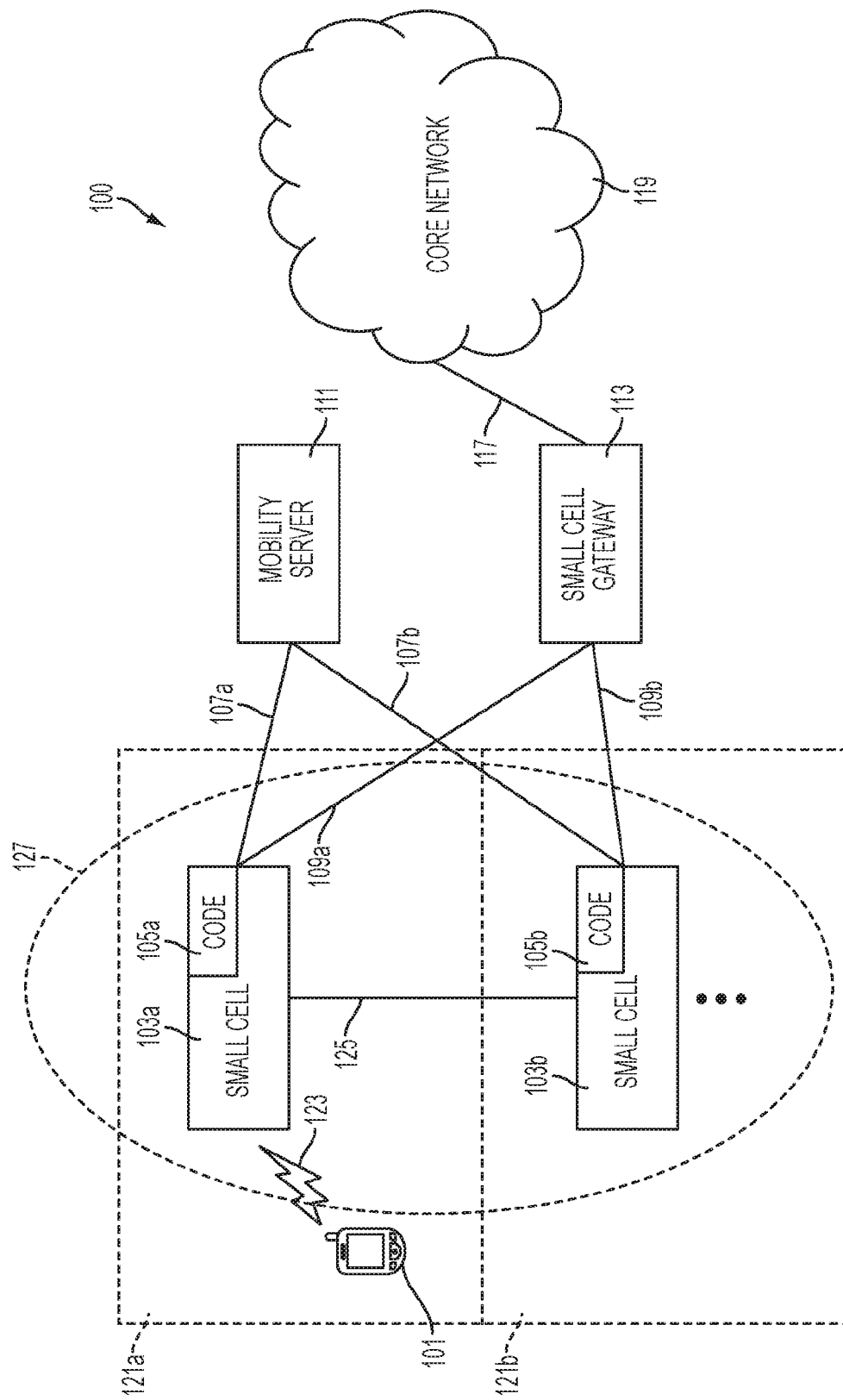
FIG. 1 illustrates a communication network including a plurality of small cells in accordance with certain embodiments.

Certain embodiments disclose a method that can include receiving, at a first small cell of a plurality of small cells, a message including a mobility area update request from a user equipment (UE). The plurality of small cells can constitute a preconfigured cluster of small cells. The method can also include registering, at the first small cell, location information of the UE with a small cell gateway in communication with the preconfigured cluster of small cells, and retrieving, at the first small cell, a core network periodic timer for the UE from a mobility server in communication with the preconfigured cluster of small cells. If it is determined that at least one of the following is true: (i) the mobility area update request from the UE is received at the first small cell for a first time after the UE moves into a preconfigured cluster area covered by all of the small cells from the preconfigured cluster of small cells, (ii) the core network periodic timer has expired, and (iii) the mobility area update request from the UE is received at the first small cell for the first time after the UE is turned on, the method can include the following steps: forwarding, from the first small cell, the mobility area update request to a core network via the small cell gateway, receiving, at the first small cell, a core network-generated mobility area update accept message from the core network in response to the mobility area update request, and, updating, at the first small cell, the core network periodic timer of the UE in the mobility server with a time at which the core network-generated mobility area update accept message was received. Otherwise, the method can include generating, at the first small cell, a locally-generated mobility area update accept message in response to the mobility area update request. The method can also include updating, at the first small cell, the location information of the UE with the mobility server, and sending, from the first small cell, (i) at least one of the locally generated mobility area update accept message and the core network-generated mobility area update accept message to the UE, and (ii) a local periodic timer to the UE instructing the UE to send another mobility area update request when the local periodic timer expires.

In some embodiments, the method can also include receiving, at the first small cell, a paging request from the core network, and paging the UE from the first small cell in response to the paging request.

In some embodiments, the method can also include determining, at the first small cell, whether the UE is no longer located within a local area covered by the first small cell, and, if the UE is no longer located within the local area, sending, at the first small cell, the paging request to each remaining small cell in the preconfigured cluster of small cells to allow a second small cell in the preconfigured cluster to page the UE in response to the paging request. The paging request can be sent over inter-small-cell connections established between the first small cell and each remaining small cell in the preconfigured cluster of small cells.

In some embodiments, the mobility area update request can include a location area update request, a routing area update request, or a combination of the two; and the mobility area update response can include a location area update response, a routing area update response, or a combination of the two.

In some embodiments, the determination of whether the mobility area update request from the UE is received at the first small cell for a first time after the UE moves into a preconfigured cluster area covered by all of the small cells from the preconfigured cluster of small cells can be based on a previous mobility area code within the mobility area update request.

In some embodiments, the previous mobility area code can comprise at least one of a location area code and a routing area code; the preconfigured cluster of small cells can share at least one of a common location area code and a common routing area code; the preconfigured cluster of small cells can share at least one of a known set of location area codes and a known set of routing area codes; the small cell can be Home Node Bs (HNBs), and the small cell gateway can be a Home Node B Gateway (HNB-GW); the inter-small-cell connections can be $I_{URH}$ connections; the local periodic timer and the core network periodic timer can be T3212 periodic location area update timers or T3312 periodic routing area update timers; the mobility server can be incorporated into a standalone device, incorporated into the small cell gateway, or distributed across each small cell in the preconfigured cluster of small cells.

Certain embodiments disclose a network device that can include a memory capable of storing data and a processor. The network device can be part of a preconfigured cluster of network devices. The processor can be configured for using the data such that the network device receives a message including a mobility area update request from a user equipment (UE). The processor can also be configured for using the data such that the network device registers location information of the UE with a gateway in communication with the preconfigured cluster of network devices, and retrieves a core network periodic timer for the UE from a mobility server in communication with the preconfigured cluster of network devices. If the network device determines that at least one of the following is true: (i) the mobility area update request from the UE is received at the network device for a first time after the UE moves into a preconfigured cluster area covered by all of the network devices from the preconfigured cluster of network devices, (ii) the core network periodic timer has expired, and (iii) the mobility area update request from the UE is received at the network device for the first time after the UE is turned on, the processor can be configured for using the data such that the network device forwards the mobility area update request to a core network via the gateway, receives a core network-generated mobility area update accept message from the core network in response to the mobility area update request, and updates the core network periodic timer of the UE in the mobility server with a time at which the core network-generated mobility area update accept message was received. Otherwise, the processor can be configured for using the data such that the network device generates a locally-generated mobility area update accept message in response to the mobility area update request. The processor can also be further configured to update the location information of the UE with the mobility server, and send (i) at least one of the locally-generated mobility area update accept message and the core network-generated mobility area update accept message to the UE, and (ii) a local periodic timer to the UE instructing the UE to send another mobility area update request when the local periodic timer expires.

In some embodiments, the processor can be further configured to use the data to cause the network device to receive a paging request from the core network, and to page the UE in response to the paging request.

In some embodiments, the processor can be further configured to use the data to cause the network device to determine whether the UE is no longer located within a local area covered by the network device, and, if the UE is no longer located within the local area, send the paging request to each remaining network device in the preconfigured cluster of network devices to allow a second network device in the preconfigured cluster to page the UE in response to the paging request. The paging request can be sent over inter-network device connections established between the network device and each remaining network device in the preconfigured cluster of network devices.

In another aspect, certain embodiments include systems and methods for receiving, at a first small cell of a plurality of small cells, a message including a mobility update request from a user equipment (UE). The plurality of small cells constitute a preconfigured cluster of small cells. The method also includes sending from the first small cell an update request to a core network for registering location information of the UE with the core network, receiving, at the first small cell, a paging request from the core network, and paging the UE from the first small cell in response to the paging request. If it is determined at the first small cell that the UE is no longer located within the area covered by the first small cell, the method also includes sending, such as by broadcasting, the paging request to one or more other small cells to notify the UE of the paging request such that the UE can respond to the paging request.

Example Embodiments

FIG. 1 illustrates a communication system 100 with a plurality of small cells in accordance with certain embodiments. FIG. 1 includes a user equipment (UE) 101, a number of small cells 103a, 103b, etc., wherein each small cell can have a corresponding mobility area code 105a, 105b, etc. FIG. 1 further includes a mobility server 111, a small cell gateway 113 and a core network 119. Each small cell 103a, 103b, etc. can serve UEs located in corresponding local areas 121a, 121b, etc. Since UE 101 is located within local area 121a, UE 101 can be in wireless communication via a wireless link 123 with small cell 103a having mobility area code 105a. A plurality of small cells can constitute a preconfigured cluster of small cells 127; although preconfigured cluster 127 is shown with only two small cells in FIG. 1, it is to be understood that a preconfigured cluster can comprise many more small cells. Each small cell 103a, 103b, etc. can be in communication with mobility server 111 via communication links 107a, 107b, etc., and can also be in communication with small cell gateway 113 via communication links 109a, 109b, etc. The small cell gateway 113 can be in communication with the core network 119 via communication link 117. Finally, small cells 103a, 103b, etc. can be in direct communication with each other via inter-small-cell connections. For example, small cell 103a can communicate with small cell 103b via inter-small-cell connection 125.

In certain embodiments, small cells 103a, 103b, etc. can be Home Node Bs (HNBs), and small cell gateway 113 can be a Home Node B Gateway (HNB-GW). While mobility server 111 is illustrated as a stand-alone component, mobility server 111 can also be combined with small cell gateway 113, or distributed across a plurality of small cells. The inter-small-cell connections (e.g., inter-small-cell connection 125) can be $I_{URH}$ connections. The mobility area codes 105a, 105b, etc. can be location area codes (LACs) or routing area codes (RACs). All small cells in a preconfigured cluster of small cells 127 can share either a common mobility area code, or a known set of mobility area codes.

Figure 2A:
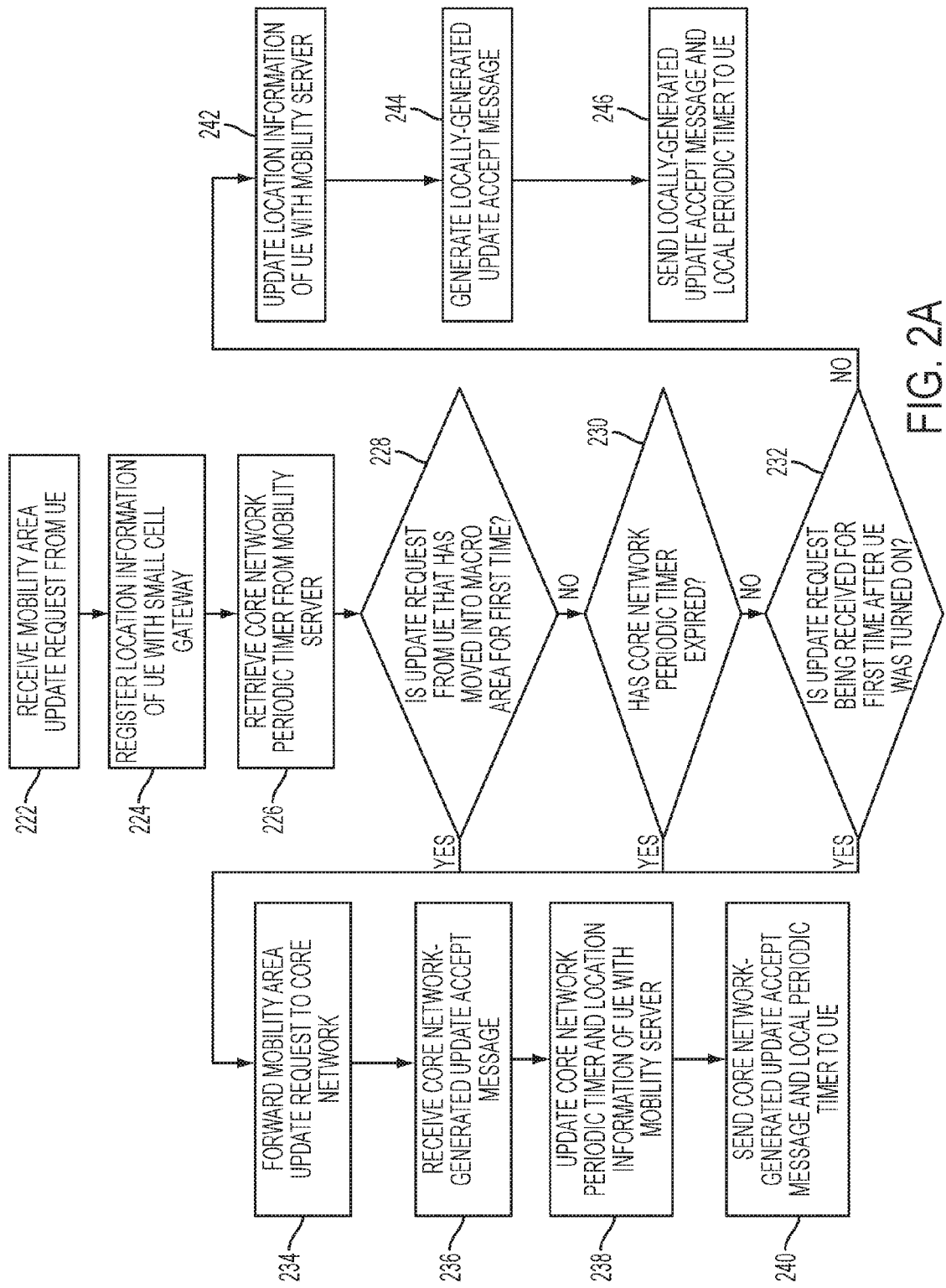
FIG. 2A is a flow chart illustrating steps undertaken by a small cell in a mobility area update procedure in accordance with certain embodiments.

FIG. 2A is a flow-chart illustrating the steps undertaken by a small cell in a mobility area update procedure in accordance with certain embodiments. The small cell in FIG. 2A can be in communication with a UE, a mobility server, a small cell gateway and a core network. Furthermore, the small cell can be one of a plurality of small cells, wherein the plurality of small cells form a preconfigured cluster of small cells. The update procedure begins when the small cell receives a mobility area update request from a UE at 222. In response, the small cell registers location information of the UE with the small cell gateway at 224, and also retrieves a core network periodic timer from the mobility server at 226.

The small cell can then make a series of determinations. First, it can determine at 228 whether the update request is from a UE that has moved into a preconfigured cluster area that is served by all the small cells in the preconfigured cluster of small cells. Second, it can determine at 230 whether the core network periodic timer has expired. Third, it can determine at 232 if the mobility area update request is being received at the small cell for the first time after the UE was turned on. In certain embodiments, the small cell can make some of these determinations based on a previous mobility area code included in the mobility area update request. For example, the UE can include in its mobility area update request the mobility area code of the small cell it had previously been served by. If the previous mobility area code included in the mobility area update request matches either (i) the mobility area code of the present small cell, or (ii) the mobility area code of any of the small cells in the preconfigured cluster of small cells, the small cell can determine at 228 that the UE has not moved into the preconfigured cluster area for the first time. Similarly, if no previous mobility area code is included in the mobility area update request, the small cell can be configured to conclude in 232 that the update request is being received for the first time after the UE was turned on. In certain embodiments, the small cell can make some of these determinations based on a cause code included in the mobility area update request. For example, a UE that powers on in the coverage of a small cell can include in its mobility area update request a cause indicating that it wants to perform an initial attach to the network. Finally, the small cell can determine whether the core network periodic timer has expired at 230 by examining the core network periodic timer retrieved from the mobility server at 226. The small cell can also compare the information retrieved from the mobility server at 226 with information stored in a local memory at the small cell to determine whether the core network periodic timer has expired.

If the small cell determines that any of the conditions checked in 228, 230 and 232 are true, the small cell can initiate a core network update. Specifically, the small cell can forward the mobility area update request to the core network at 234, and receive a core network-generated mobility area update accept message at 236. The small cell can then update the core network periodic timer with a time at which the core network-generated mobility area update accept message was received at 238. This update can cause the periodic timer to reset to a predetermined value. In addition, the small cell can also update the mobility server with location information of the UE at 238. Finally, the small cell can then send the core network-generated mobility area update accept message and a local periodic timer to the UE at 240. The local periodic timer instructs the UE to send a second mobility area update request within a predetermined time.

Conversely, if the small cell determines that none of the conditions checked in 228, 230 and 232 are true, the small cell can initiate a local update. Specifically, the small cell can update the location information of the UE with the mobility server at 242, and generate a locally-generated mobility area update accept message at 244. The small cell can also send the locally-generated update accept message and a local periodic timer to the UE at 246. The local periodic timer instructs the UE to send a second mobility area update request within a predetermined time.

In some embodiments, the mobility area update request can be either a location area update request or a routing area update request, and the mobility area codes can be location area codes (LACs) or routing area codes (RACs). The small cells can be Home Node Bs (HNBs), and the small cell gateway can be a Home Node B Gateway (HNB-GW). The preconfigured cluster of small cells can encompass small cells having a common location area code (LAC) or a common routing area code (RAC). The preconfigured cluster of small cells can also encompass small cells sharing a known set of LACs or RACs. The core network periodic timer and the local periodic timer can be T3212 periodic location area update timers or T3312 periodic routing area update timers. The core network periodic timer can be set to a longer period of time (e.g., 10 deci-hours, i.e., 60 minutes, or 7 deci-hours, i.e., 42 minutes) than the local periodic timer (e.g., 1 deci-hour, or six minutes). In this way, the core network can be updated less often, thereby reducing the number of mobility area update requests received and processed by the core network. Finally, the mobility server can be incorporated into a standalone device, into the small cell gateway, or can be distributed among each small cell in the preconfigured cluster of small cells.

Figure 2B:
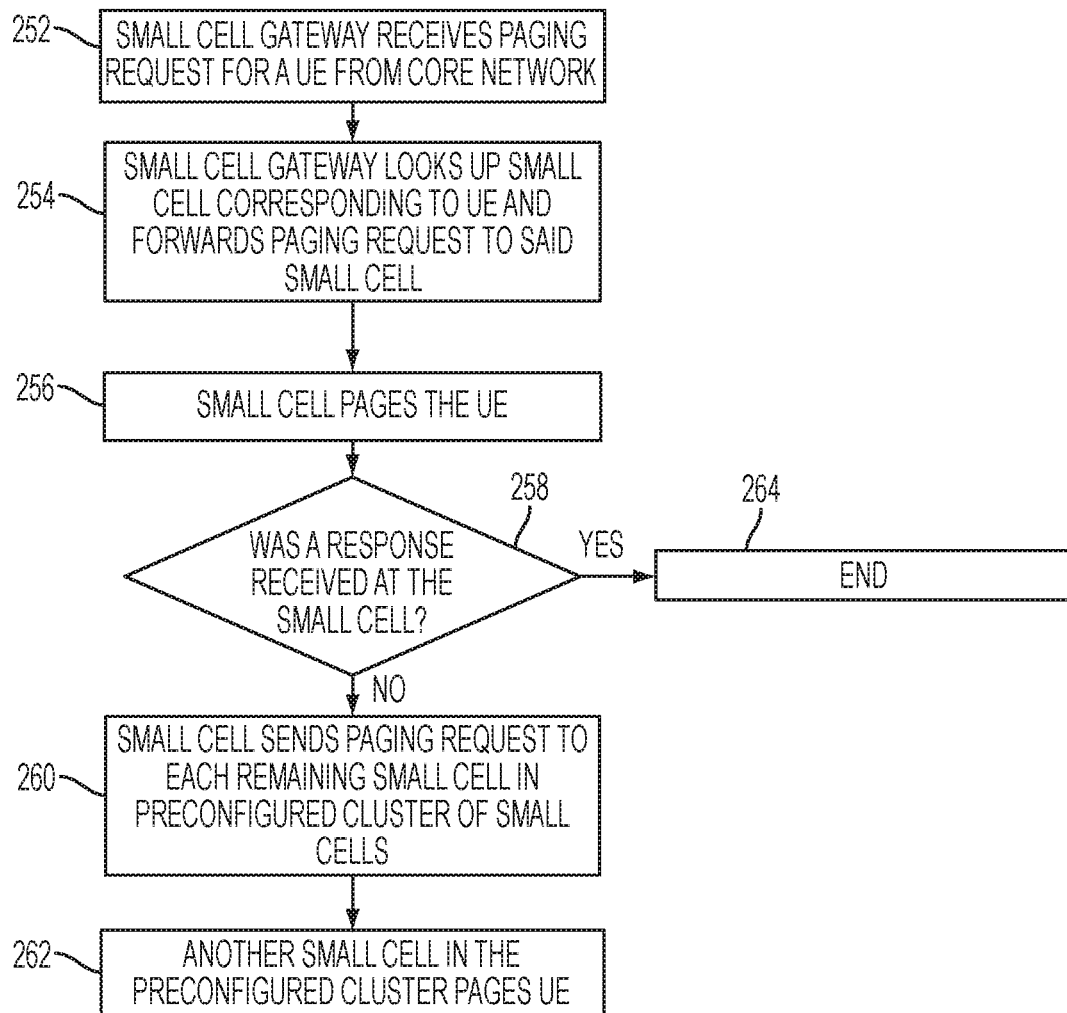
FIG. 2B is a flow chart illustrating steps for processing a paging request from the core network.

FIG. 2B is a flow chart illustrating the steps for processing a paging request from the core network. The small cell gateway receives a paging request from the core network at 252. At 254, the small cell gateway looks up the small cell corresponding to the UE. This can be done either by looking up the appropriate small cell within the small cell gateway's own internal memory, or by having the small cell gateway communicate with the mobility server to retrieve the identity of the appropriate small cell. In some embodiments, the small cell corresponding to the UE can be the last small cell to register the UE with the small cell gateway or mobility server. Once the appropriate small cell corresponding to the UE has been identified, the small cell gateway forwards the paging request to the identified small cell. At 256, the small cell to which the paging request has been forwarded pages the UE. At 258, the small cell checks to see if a response was received from the UE, indicating that the UE is still located in a local area served by the small cell. If a response is received, the small cell completes the paging request procedure at 264. If no response is received within a certain time, the small cell will assume at 260 that the UE may have left the local area and will send the paging request to each remaining small cell in the preconfigured cluster of small cells. The paging request can be sent over inter-small-cell connections established between each small cell in the preconfigured cluster of small cells. In some embodiments, these inter-small-cell connections can be $I_{URH}$ connections. By sending the paging request to each remaining small cell in the preconfigured cluster of small cells, the small cell can allow another small cell in the preconfigured cluster to page the UE in response to the paging request, at 262.

While small cells can include Home NodeBs, they can include other low-power wireless access points, such as femtocells, picocells, metrocells, and microcells, any of which can implement the specifications generally known as femtocell technology. Such small cells can provide improved cellular coverage, capacity, and applications.

FIGS. 3-14 and their associated discussion below present examples embodiments according to the process described above. While these figures and their associated discussion refer to specific devices and concepts, it is to be understood that these devices and concepts are being presented by way of example only and the present disclosure is not limited to them. For example, while the discussion below refers to location area codes (LACs), location update request messages, location update accept messages and location update timers (e.g., T3212 timers), it is to be understood the disclosure below can also be applied to small cells generally, including routing area codes, routing update request messages, routing update accept messages, and routing update timers (e.g., T3312 timers). Also, while these figures and their associated discussion refer to Home Node Bs (HNBs) and Home Node B Gateways (HNB-GWs), it is to be understood that the disclosure below can also be applied to different types of small cells and small cell gateways. Finally, while these figures and their associated discussion refer to a mobility server, it is to be understood that a mobility server may be incorporated into a stand-alone device, into a small cell gateway such as a HNB-GW, or may be distributed across all the small cells in the preconfigured cluster of small cells.

Figure 3:
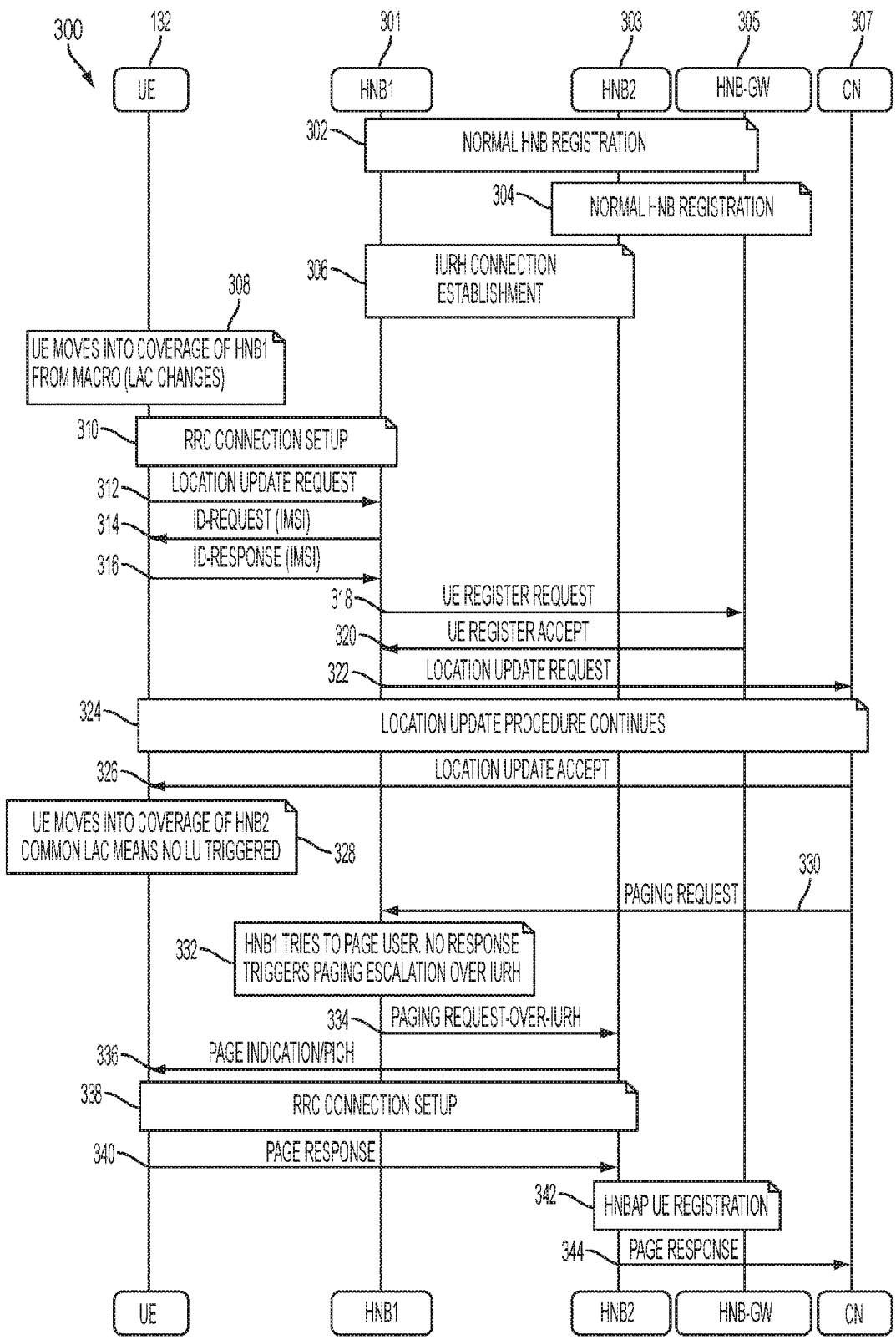
FIG. 3 is a signal flow diagram for illustrating a paging process for idle mode mobility of UEs using a cluster of Home Node Bs (HNBs) having a common location area code (LAC) in accordance with certain embodiments.

FIG. 3 is a signal flow diagram 300 for illustrating a paging process for idle mode mobility of UEs using a cluster of HNBs having a common location area code (LAC) in accordance with certain embodiments. Referring to FIG. 3, a cluster of Home Node Bs (HNBs) sharing a common LAC (e.g., HNB1 301 and HNB2 303) registers with Home Node B Gateway (HNB-GW) 305. For example, HNB1 301 registers with HNB-GW 305 at 302 and HNB2 303 registers with HNB-GW 305 at 304. At 306, an $I_{URH}$ connection between each different pairs of HNBs in the cluster is established. For example, an $I_{URH}$ connection is established between HNB1 301 and HNB2 303.

At 308, user equipment (UE) 132 moves into an area covered by the cluster for the first time by, for example, moving into an area covered by HNB1 301. At 310, UE 132 establishes a radio resource control (RRC) connection with HNB1 301 and sends, at 312, a location update request to HNB1 301. At 314, HNB1 301 sends an ID request message to UE 132 and UE 132 in response sends, at 316, an ID response messaging. In some embodiments, the ID response message includes an international mobile subscriber identity (IMSI) of UE 132.

Upon receiving the ID response message from UE 132, HNB1 301 sends, at 318, a UE register request to HNB-GW 305. In response, HNB-GW 305 sends to HNB1 301 a UE register accept message at 320. At 322, HNB1 301 sends a location update request to core network (CN) 307, thereby initiating a CN location update procedure. At 324, CN 307 and UE 132 carry out the CN location update procedure. Upon successful completion of the CN location update procedure, CN 307 sends, at 326, a location update accept message to UE 132.

At 328, UE 132 moves into an area covered by a neighboring HNB from the HNB1 301 coverage area. For instance, UE 132 moves into the area covered by HNB2 303 from the HNB1 301 coverage area. Upon receiving a call request for UE 132, CN 307 sends, at 330, a paging request to HNB1 301, which happens to be the HNB last known for hosting UE 132, because CN 307 is not aware that UE 132 left HNB1 301 coverage area to move into HNB2 303 coverage area. Because HNB1 301 is not aware that UE 132 has left its coverage area, HNB1 301 pages UE 132 at 332, but receives no response from UE 132.

At 334, HNB1 forwards the paging request to each HNB in the cluster of HNBs via the $I_{URH}$ connections established at 306. Upon receiving the forwarded paging request, the HNB that is hosting UE 132 (i.e., HNB2 303) pages UE 132 at 336. At 338, UE 132 establishes an RRC connection with HNB2 303 and sends a page response to HNB2 303 at 340. At 344, HNB2 303 relays the page response to CN 307. At 342, HNB2 303 registers with HNB-GW 305 by exchanging Home Node B Application Part (HNBAP) messages for a UE registration.

An idle mode mobility process is achieved by defining $I_{URH}$ for masking idle mode mobility from CN 307 without reintroducing the radio network controller into the Home Node B network architecture, which is also referred to as the Femto cell network architecture. The utility of $I_{URH}$ connections is enhanced to distribute the paging functions amongst the HNBs in the cluster and thereby CN 307 is not forced to update UE location for every HNB, or femto cell, transition. For instance, neighboring HNBs in a cluster of HNBs have a direct peer-to-peer signaling link amongst one another and this in turn enables a paging escalation strategy to accommodate a UE that has moved from the last (Femto) cell known to the core network.

Figure 4A:
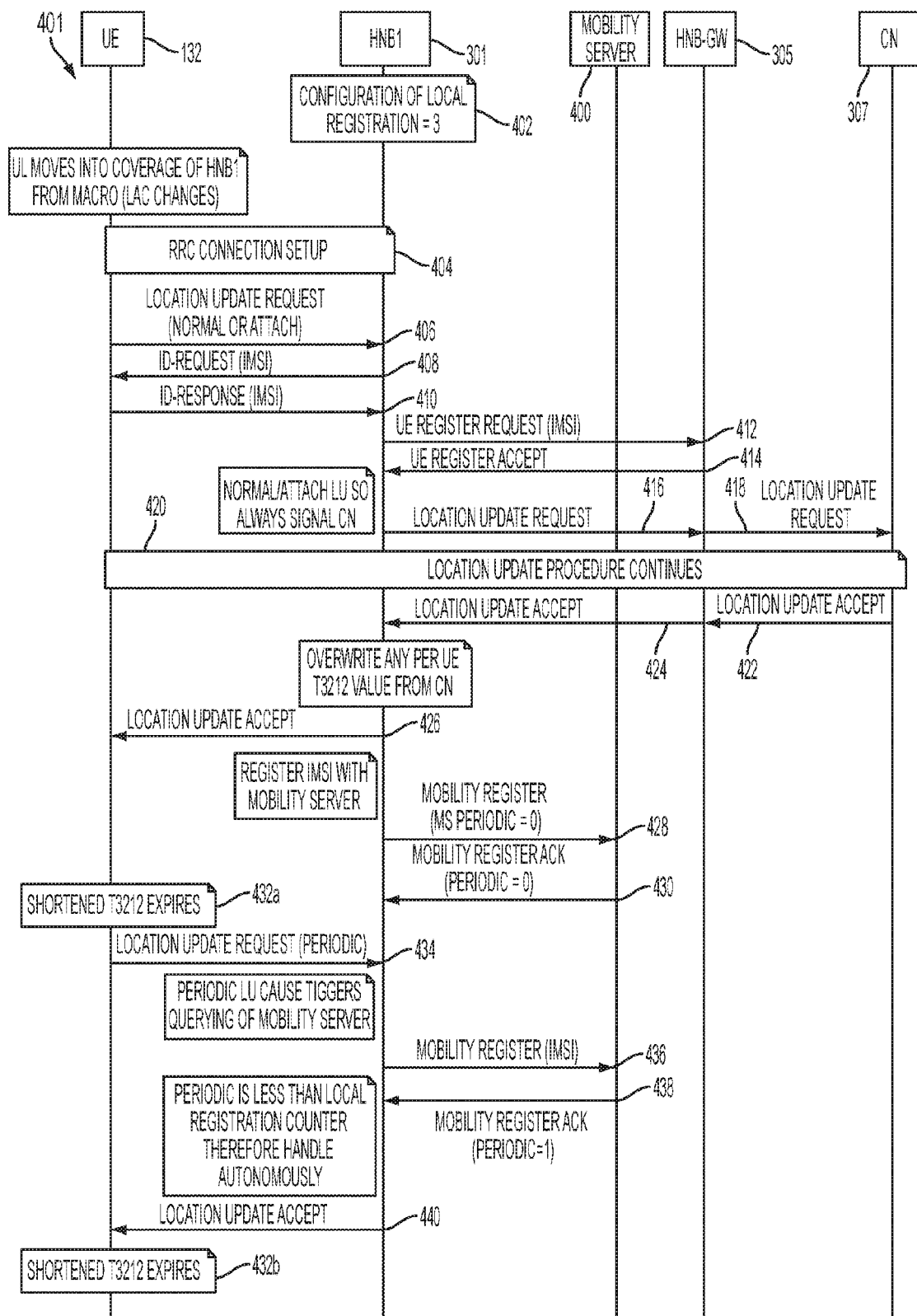
FIGS. 4A and 4B are signal flow diagrams for illustrating an idle mode mobility process using a mobility server and a shorter location update (LU) timer in accordance with certain embodiments.
Figure 4B:
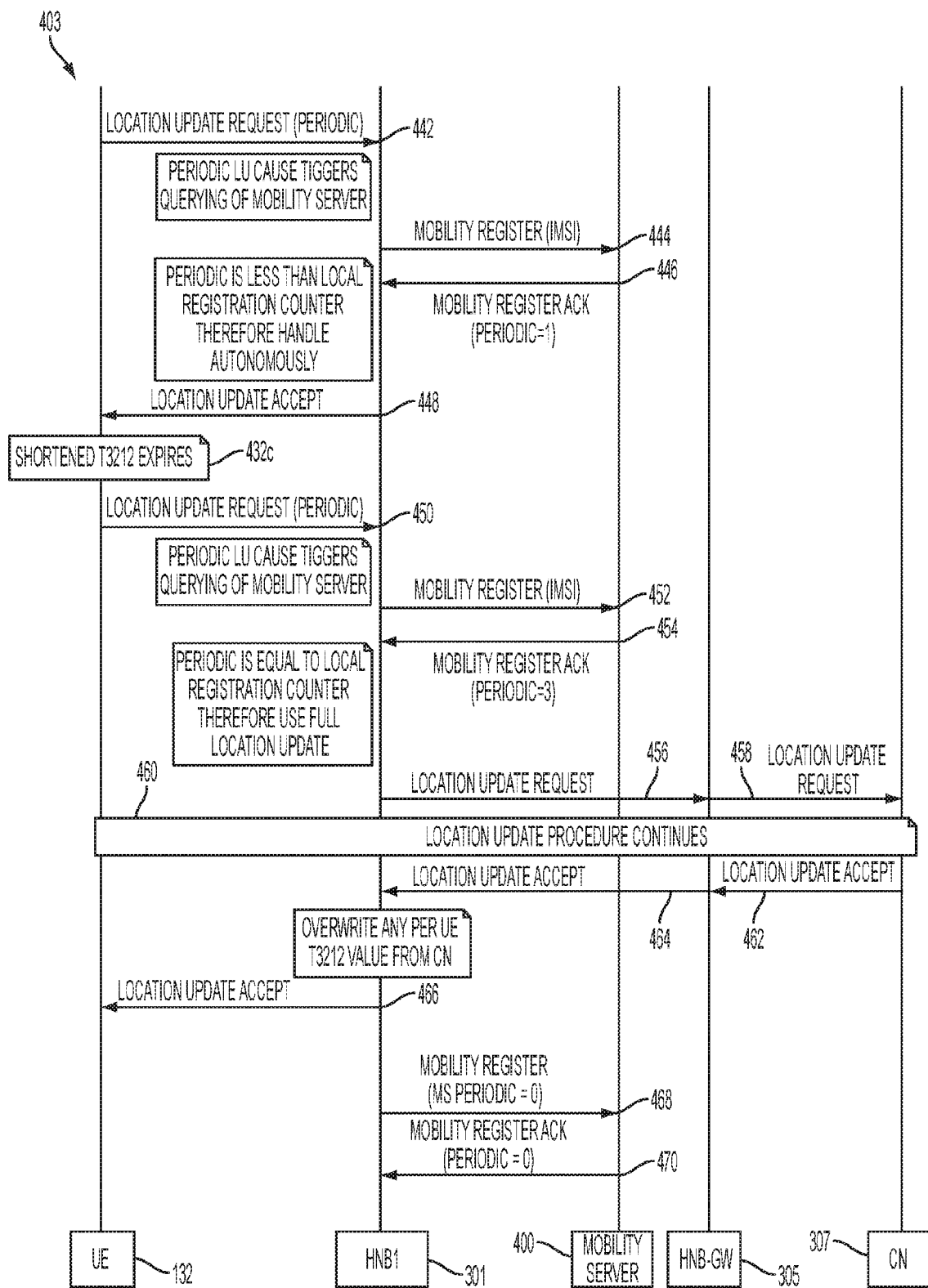

FIGS. 4A and 4B are signal flow diagrams 401, 403 for illustrating an idle mode mobility process using a mobility server and a shorter location update (LU) timer in accordance with certain embodiments. Referring to FIG. 4A, each HNB in a cluster of HNBs is configured for local location update registrations at 402. For instance, a location update registration counter for HNB1 301 may be set to three. This location update registration counter, in conjunction with the expiration counter discussed below, is an alternate way of implementing a core network periodic timer—instead of counting down the time that has elapsed since the last core network update, the location update registration counter keeps track of the number of updates that are to be completed locally between core network updates. At 404, an RRC connection is established between UE 132 and an HNB in the cluster (e.g., HNB1 301) when UE 132 moves into the area covered by the cluster for the first time. At 406, UE 132 sends a location update request to HNB1 301. At 408, HNB1 301 sends an ID request message to UE 132, and UE 132 sends, at 410, an ID response message including a unique IMSI that is associated with UE 132 in response to the ID request message.

At 412, UE 132 sends a UE Register Request including the IMSI to HNB-GW 305. At 414, HNB-GW 305 sends a UE Register Accept message to HNB1 301. At 416, HNB1 301 sends a first location update request to HNB-GW 305, and HNB-GW 305 forwards the first location update request to CN 307 at 418, thereby initiating a CN location update procedure between CN 307 and UE 132. At 420, the CN location update procedure continues. At 422, CN 307 sends a first location update accept message to HNB-GW 305 and HNB-GW 305 forwards, at 424, the first location update accept message to HNB1 301, thereby completing the CN location update procedure. Upon receiving the first location update accept message, HNB1 301 sets a location update timer (e.g., T3213 timer) to a pre-configured value (e.g., 1 deci-hour or 6 minutes) and forwards, at 426, the first location update accept message to UE 132.

At 428, HNB1 301 sends a first mobility register message to mobility server 400, registering UE 132 with mobility server 400 using its IMSI. Mobility server 400 sends, at 430, a first mobility register acknowledge message to HNB1 301. The first mobility register acknowledgement message includes an expiration counter that is initially set to zero. This expiration counter, in conjunction with the location update registration counter discussed above, is an alternate way of implementing a core network periodic timer. The expiration counter is used to indicate the number of times the location update timer is expired. In some embodiments, mobility server 400 maintains an expiration counter for each UE that is operating within the cluster of HNBs.

At 432a, the location update timer expires and this triggers UE 132 to reset the timer and send, at 434, a first location update request to HNB1 301. In response, HNB1 301 sends, at 436, a second mobility register message to mobility server 400. At 438, mobility server 400 in response increments the expiration counter by one and sends to HNB1 301 a second mobility register acknowledgement message with the expiration counter indicating that the location update timer has expired for the first time (counter=1). HNB1 301 then compares the counter value to the location update registration counter (which was set to three at 402). Because the expiration counter value (1) is smaller than three, HNB1 301 sends, at 440, a first location update accept message to UE 132.

At 432b, the location update timer expires again. Referring to FIG. 4B, the expiration of the location update timer triggers UE 132 to reset the timer and send, at 442, a second location update request to HNB1 301. At 444, HNB1 301 sends a third mobility register message to mobility server 400. At 446, mobility server 400 increments the expiration counter by one and sends to HNB1 302 a third mobility register acknowledgement message with the expiration counter indicating that the location update timer has expired for the second time (counter=2). HNB1 301 then compares the counter value to the location update registration counter, and because the expiration counter value (2) is smaller than three, HNB1 301 sends, at 448, a second location update accept message to UE 132.

At 432c, the location update timer expires yet again and this triggers UE 132 to reset the timer and sends, at 450, a third location update request to HNB1 301. At 452, HNB1 301 increments the expiration counter by one and sends a fourth mobility register message to mobility server 400. At 454, mobility server 400 sends a fourth mobility register acknowledgement message with the expiration counter indicating that the location update timer has expired for the third timer (counter=3). HNB1 301 then compares the counter value to the location update registration counter, and because the expiration counter value (3) is equal to the location update registration counter value, HNB1 301 sends, at 456, a second location update request to HNB-GW 307. At 458, HNB-GW 305 forwards the second location update request to CN 307, thereby initiating a CN location update procedure between CN 307 and UE 132. At 460, the CN location update procedure continues. At 462, CN 307 sends a second location update accept message to HNB-GW 305. At 464, HNB-GW 305 forwards the second location update accept message to HNB1 301, thereby completing the CN location update procedure. At 466, HNB1 301 forwards the second location update accept message to UE 132. At 468, HNB1 301 sends a fifth mobility register message to mobility server 400. At 470, mobility server 400 resets the expiration counter to zero and sends a fifth mobility registration acknowledgement message to HNB1 301.

Figure 5:
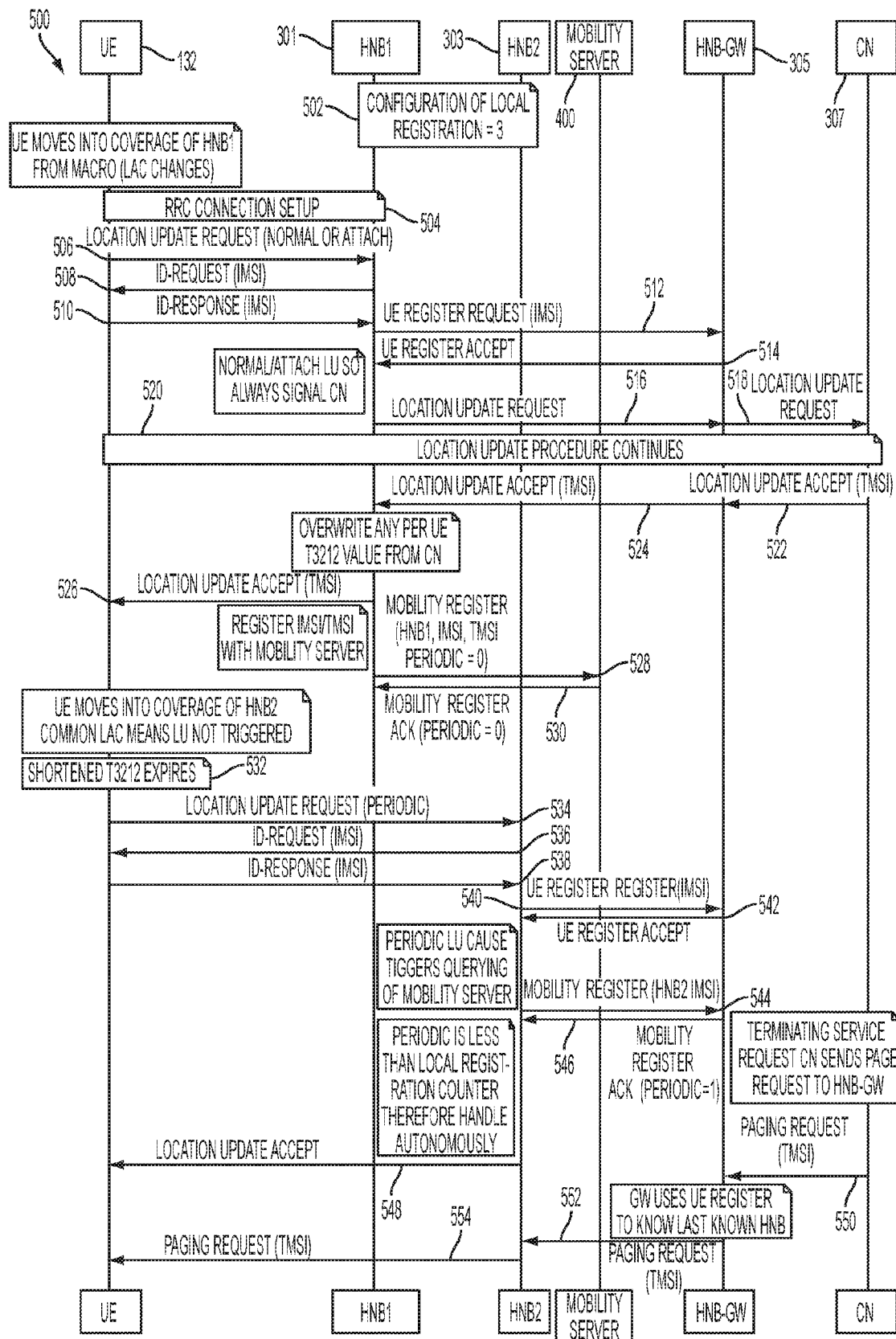
FIG. 5 is a signal flow diagram for illustrating an idle mode mobility process using a mobility server and a shorter LU timer wherein a paging occurs after the location update timer expires in accordance with certain embodiments.

FIG. 5 is a signal flow diagram 500 for illustrating an idle mode mobility process using a mobility server and a shorter LU timer wherein a paging occurs after the location update timer expires in accordance with certain embodiments. Referring to FIG. 5, each HNB in a cluster of HNBs is configured for local location update registrations at 502. For instance, a location update registration counter for HNB1 301 and HNB2 303 may be set to a positive integer value (e.g., three). At 504, an RRC connection is established between UE 132 and an HNB in the cluster (e.g., HNB1 301) when UE 132 moves into an area covered by the cluster (e.g., the area covered by HNB1 301) for the first time.

At 506, UE 132 sends a first location update request to HNB1 301. In response, HNB1 301 sends, at 508, an ID request message to UE 132. At 510, UE 132 sends to HNB1 301 an ID response message including a unique IMSI that is associated with UE 132. At 512, HNB1 301 sends a first UE registration request including the IMSI to HNB-GW 305. In response, HNB-GW 305 sends, at 514, a first UE registration accept message to HNB1 301. At 516, HNB1 301 sends a location update request to HNB-GW 305, and HNB-GW 305 forwards, at 518, the location update request to CN 307, thereby initiating a CN location update procedure. At 520, the CN location update procedure continues. At 522, CN 307 sends to UE 132 to HNB-GW 305 a location update accept message including a TMSI assigned, and HNB-GW 305 forwards, at 524, the location update accept message including a temporary mobile subscriber identity (TMSI) to HNB1 301, thereby completing the location update procedure. Upon receiving the location update accept message from HNB-GW 305, HNB1 301 sets a location update timer (e.g., T3212 timer) to a pre-configured value (e.g., 1 deci-hour or 6 minutes) and forwards, at 526, the location update accept message to UE 132.

At 528, HNB1 301 sends a first mobility register message to mobility server 400, registering UE 132 with mobility server 400 using its IMSI and the TMSI received from CN 307. Mobility server 400 sends, at 530, a first mobility register acknowledgement message to HNB1 301. The mobility register acknowledgement message includes an expiration counter that is initially set to zero. The expiration counter is used to indicate the number of times the location update timer is expired. In some embodiments, mobility server 400 maintains an expiration counter for each UE that is operating within the cluster of HNBs.

At 532, the location update timer expires after UE 132 leaves the HNB1 coverage area and enters the area covered by HNB2 303. In response to its moving into the HNB2 coverage area, UE 132 sends, at 534, a second location update request to HNB2 303. In response, HNB2 303 sends, at 536, an ID request message to UE 132. At 538, UE 132 sends an ID response message including its IMSI to HNB2 303. At 540, HNB2 303 sends a second UE registration request to HNB-GW 305. In response, HNB-GW 305 sends, at 542, a second UE registration accept message to HNB2 303.

In response to the expiration of the location update timer, HNB2 303 sends, at 544, a second mobility register message including a unique IMSI that is associated with UE 132 to mobility server 400. At 546, mobility server 400 increments the expiration counter by one and sends a second mobility register acknowledgement message to HNB2 303. Because the expiration counter value (1) is smaller than the location update registration counter value (set to three at 502), HNB2 303 sends, at 548, a second location update accept message to UE 132.

At 550, CN 307 sends a paging request for UE 132 (identified using the TMSI assigned to UE 132 that is included in the paging request) to HNB-GW 305, which knows the HNB in the cluster that is last known for hosting UE 132. At 552, HNB-GW 305 forwards the paging request to HNB2 303 (i.e., the HNB last known for hosting UE 132). At 554, HNB2 303 further forwards the paging request to UE 132.

Figure 6:
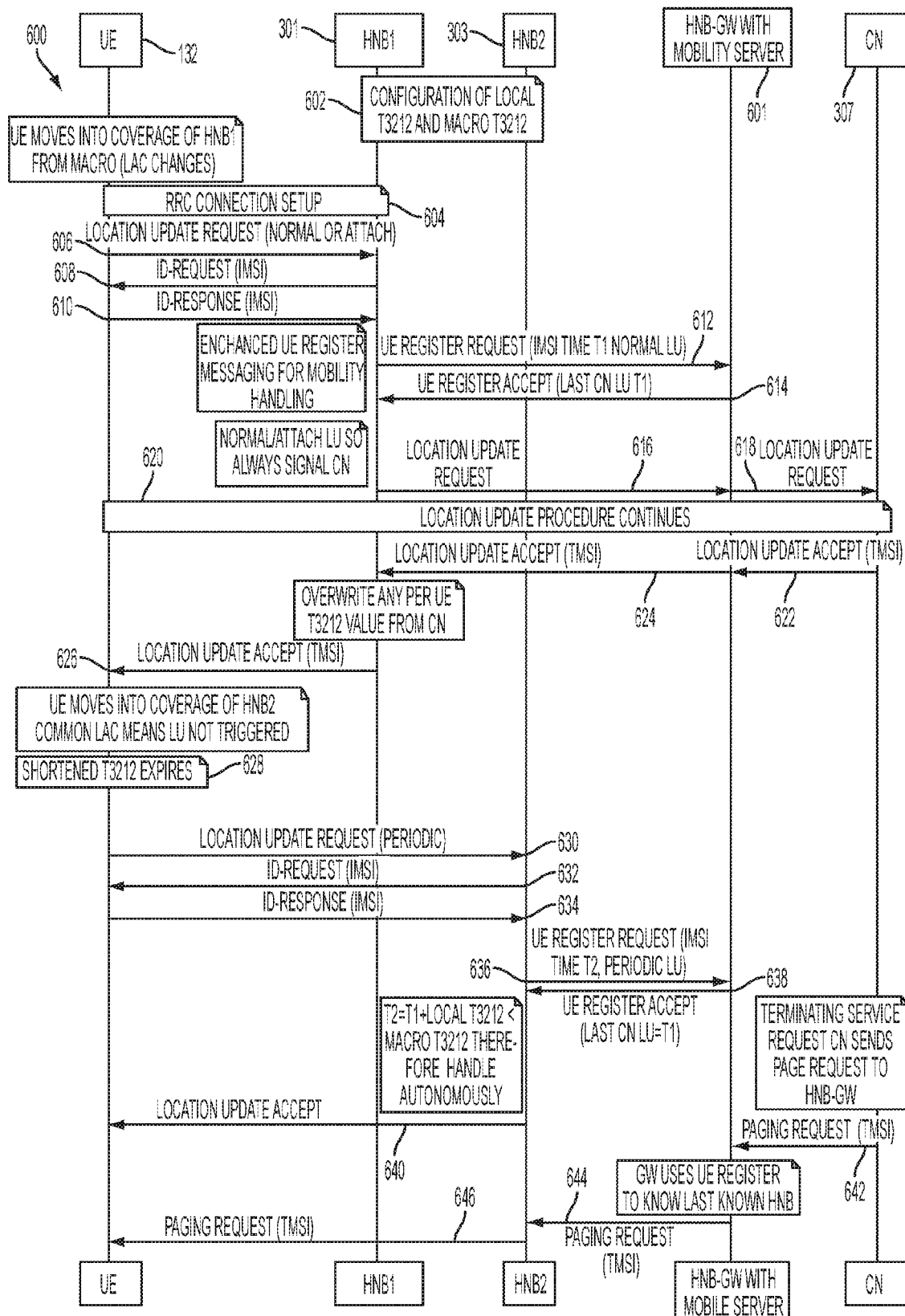
FIG. 6 is a signal flow diagram for illustrating an idle mode mobility process using a Home Node B Gateway (HNB-GW) including a mobility server and a shorter LU timer wherein a paging occurs after the location update timer expires in accordance with certain embodiments.

FIG. 6 is a signal flow diagram 600 for illustrating an idle mode mobility process using a Home Node B Gateway (HNB-GW) including a mobility server and a shorter LU timer wherein a paging occurs after the location update timer expires in accordance with certain embodiments. Referring to FIG. 6, each HNB in a cluster of HNBs is configured for local and macro location update timers at 602. For instance, a local location update timer and a macro location update timer for HNB1 301 and HNB2 303 may be set to a predetermined value (e.g., 1 deci-hour, or 6 minutes, for the location timer and 7 deci-hours, or 42 minutes, for the macro timer). At 604, an RRC connection is established between UE 132 and an HNB in the cluster (e.g., HNB1 301) when UE 132 moves into an area covered by the cluster for the first time (e.g., the area covered by HNB1 301).

At 606, UE 132 sends a first location update request to HNB1 301. In response, HNB1 301, at 608, sends an ID request message to UE 132. At 610, UE 132 sends to HNB1 301 an ID response message including a unique IMSI that is associated with UE 132. At 612, HNB1 301 sends to HNB-GW including a mobility server (HNB-GW/Mobility Server) 601 a first UE registration request including the IMSI and a first time ($T_1$) at which the last location update was reported to CN 307. In response, HNB-GW/Mobility Server 601 sets a last CN location update time to the first time ($T_1$) and sends, at 614, a first UE registration accept message to HNB1 301. At 616, HNB1 301 sends a location update request to HNB-GW/Mobility Server 601, and HNB-GW/Mobility Server 601 forwards, at 618, the location update request to CN 307, thereby initiating a location update procedure. At 620, the CN location update procedure continues. At 622, CN 307 sends to HNB-GW/Mobility Server 601 a CN location update accept message including a TMSI assigned to UE 132, and HNB-GW/Mobility Server 601 forwards, at 624, the location update accept message including the TMSI to HNB1 301, thereby completing the CN location update procedure. Upon receiving the location update accept message from HNB-GW/Mobility Server 601, HNB1 301 sets a location update timer (e.g., T3212 timer) to a pre-configured value (e.g., 1 deci-hour or 6 minutes) and, at 626, forwards the location update accept message to UE 132.

At 628, the location update timer expires after UE 132 leaves the HNB1 coverage area and enters the area covered by HNB2 303. In response to its moving into the HNB2 coverage area, UE 132 sends, at 630, a second location update request to HNB2 303. In response, HNB2 303 sends, at 632, an ID request message to UE 132. At 634, UE 132 sends an ID response message including its IMSI to HNB2 303. In response to the expiration of the location update timer, HNB2 303 sends to HNB-GW/Mobility Server 601, at 636, a second UE registration request including its IMSI and a second time (T2) at which the last autonomous (local) location update was reported to HNB-GW/Mobility Server 601. In response, HNB-GW/Mobility Server 601 sends, at 638, a second UE registration accept message to HNB2 303.

At 640, HNB2 303 sends a second location update accept message to UE 132, if the sum of the local location update timer value and the value resulting from subtracting the first time ($T_1$) from the second time ($T_2$)—i.e., ($T_2-T_1$+local location update timer) is smaller than the macro location update timer value. This is one way to implement the core network periodic timer. Since the time between the last core network update (i.e., T1) and the expected time of the next location update request (i.e., T2+Local T3212) is less than the macro location update timer (i.e., macro T3212), the update is handled locally and no network update is performed. Assume however, that $T_N$ is the time of the nth location update request (not shown). If the time between the last core network update (i.e., T1) and the expected time of the next location update request (i.e., $T_N$+Local T3212) is greater than the macro location update timer (i.e., $T_N$+Local T3212−T1≥macro T3212), then the update will be forwarded to the core network to initiate a CN location update procedure.

At 642, CN 307 sends a paging request for UE 132 (identified using the TMSI assigned to UE 132 included in the paging request) to HNB-GW/Mobility Server 601, which knows the HNB in the cluster that is last known for hosting UE 132. At 644, HNB-GW/Mobility Server 601 forwards the paging request to HNB2 303 (i.e., an HNB last known for hosting UE 132). At 646, HNB2 303 further forwards the paging request to UE 132.

Figure 7:
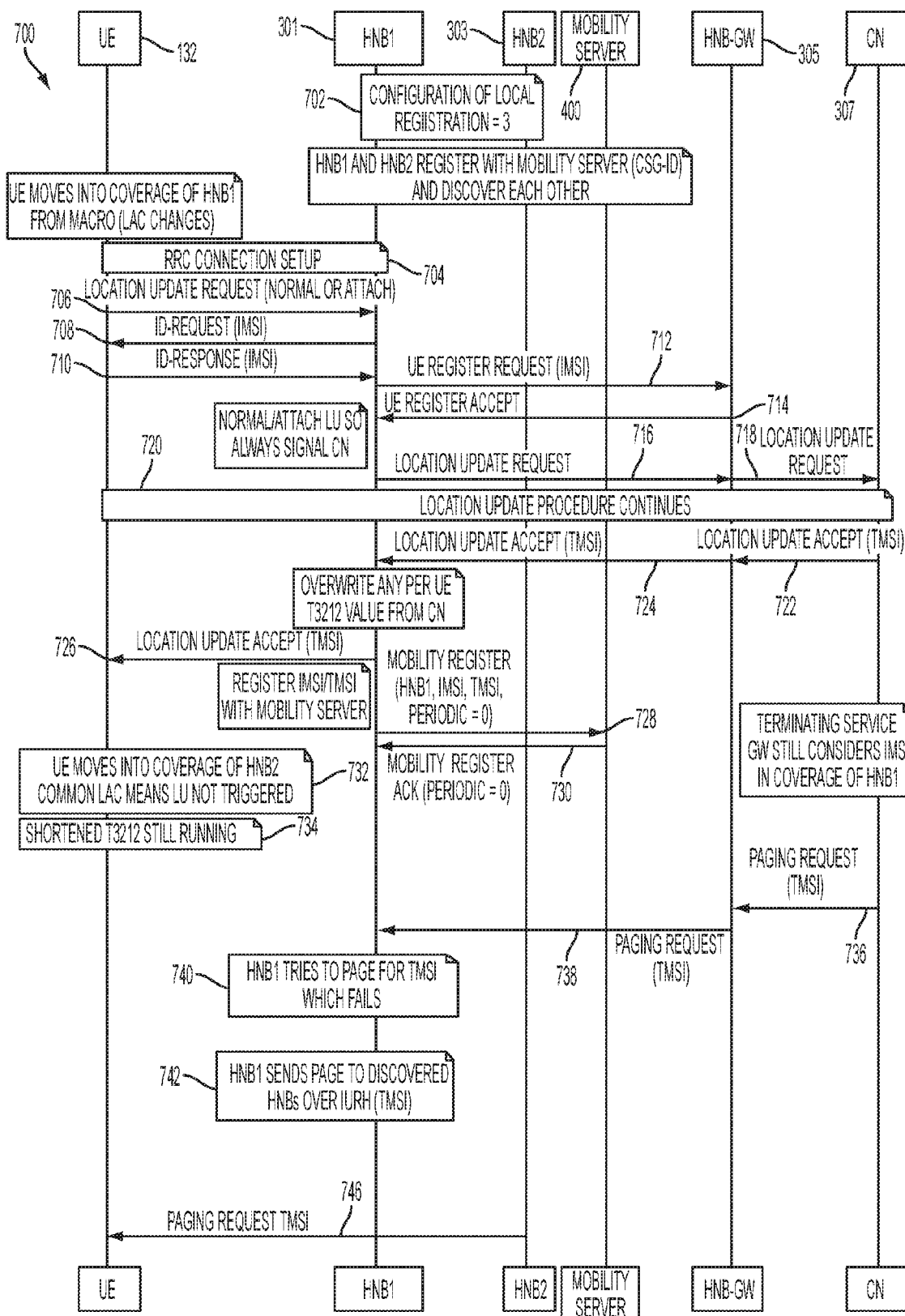
FIG. 7 is a signal flow diagram for illustrating an idle mode mobility process using a mobility server and a shorter LU timer wherein a paging occurs before a location update timer expires in accordance with certain embodiments.

FIG. 7 is a signal flow diagram 700 for illustrating an idle mode mobility process using a mobility server and a shorter LU timer wherein a paging occurs before a location update timer expires in accordance with certain embodiments. Referring to FIG. 7, each HNB in a cluster of HNBs is configured for local location update registrations at 702. For instance, a location update registration counter for HNB1 301 and HNB2 303 may be set to a positive integer value (e.g., three). The HNBs in the cluster (e.g., HNB1 and HNB2) also register with mobility server 400 and discover the presence of one another in the cluster. At 704, an RRC connection is established between UE 132 and an HNB in the cluster (e.g., HNB1 301) when UE 132 moves into an area covered by the cluster (e.g., the area covered by HNB1 301) for the first time.

At 706, UE 132 sends a first location update request to HNB1 301. In response, HNB1 301 sends, at 708, an ID request message to UE 132. At 710, UE 132 sends to HNB1 301 an ID response message including a unique IMSI that is associated with UE 132. At 712, HNB1 301 sends a first UE registration request including the IMSI to HNB-GW 305. In response, HNB-GW 305 sends, at 714, a first UE registration accept message to HNB1 301. At 716, HNB1 301 sends a location update request to HNB-GW 305, and HNB-GW 305 forwards, at 718, the location update request to CN 307, thereby initiating a CN location update procedure. At 720, the CN location update procedure continues. At 722, CN 307 sends to HNB-GW 305 a location update accept message including a TMSI assigned to UE 132, and HNB-GW 305 forwards, at 724, the location update accept message including a temporary mobile subscriber identity (TMSI) to HNB1 301, thereby completing the CN location update procedure. Upon receiving the location update accept message from HNB-GW 305, HNB1 301 sets a location update timer (e.g., T3212 timer) to a pre-configured value (e.g., 1 deci-hour or 6 minutes) and, at 726, forwards the location update accept message to UE 132.

At 728, HNB1 301 sends a first mobility register message to mobility server 400, registering UE 132 with mobility server 400 using its IMSI and the TMSI received from CN 307. Mobility server 400 sends, at 730, a first mobility register acknowledgement message to HNB1 301. The mobility register acknowledgement message includes an expiration counter that is initially set to zero. The expiration counter is used to indicate the number of times the location update timer is expired. In some embodiments, mobility server 400 maintains an expiration counter for each UE that is operating within the cluster of HNBs.

At 732, UE 132 leaves the HNB1 coverage area and enters the area covered by HNB2 303 while, at 734, the location update timer is still running. At 736, CN 307 sends a paging request for UE 132 (identified using the TMSI assigned to UE 132 that is included in the paging request) to HNB-GW 305, which knows the HNB in the cluster that is last known for hosting UE 132. At 738, HNB-GW 305 forwards the paging request to HNB1 301 (i.e., the HNB last known for hosting UE 132). The HNB last known to HNB-GW 305 for hosting UE 132 (HNB1 301) is not the same as the HNB that is hosting UE 132 (HNB2 303) because the paging request is received before the location update timer is expired. At 740, HNB1 301 attempts to page UE 132 but fails. At 742, HNB1 301 broadcasts the page request to the remaining HNBs that are initially discovered through (registering with) mobility server 400. Upon learning that HNB2 303 is currently hosting UE 132 through the broadcasting, HNB1 301 sends, at 744, the paging request to HNB2 303 through an $I_{URH}$ connection established between HNB1 301 and HNB2 303. At 746, HNB2 303 pages UE 132.

Figure 8:
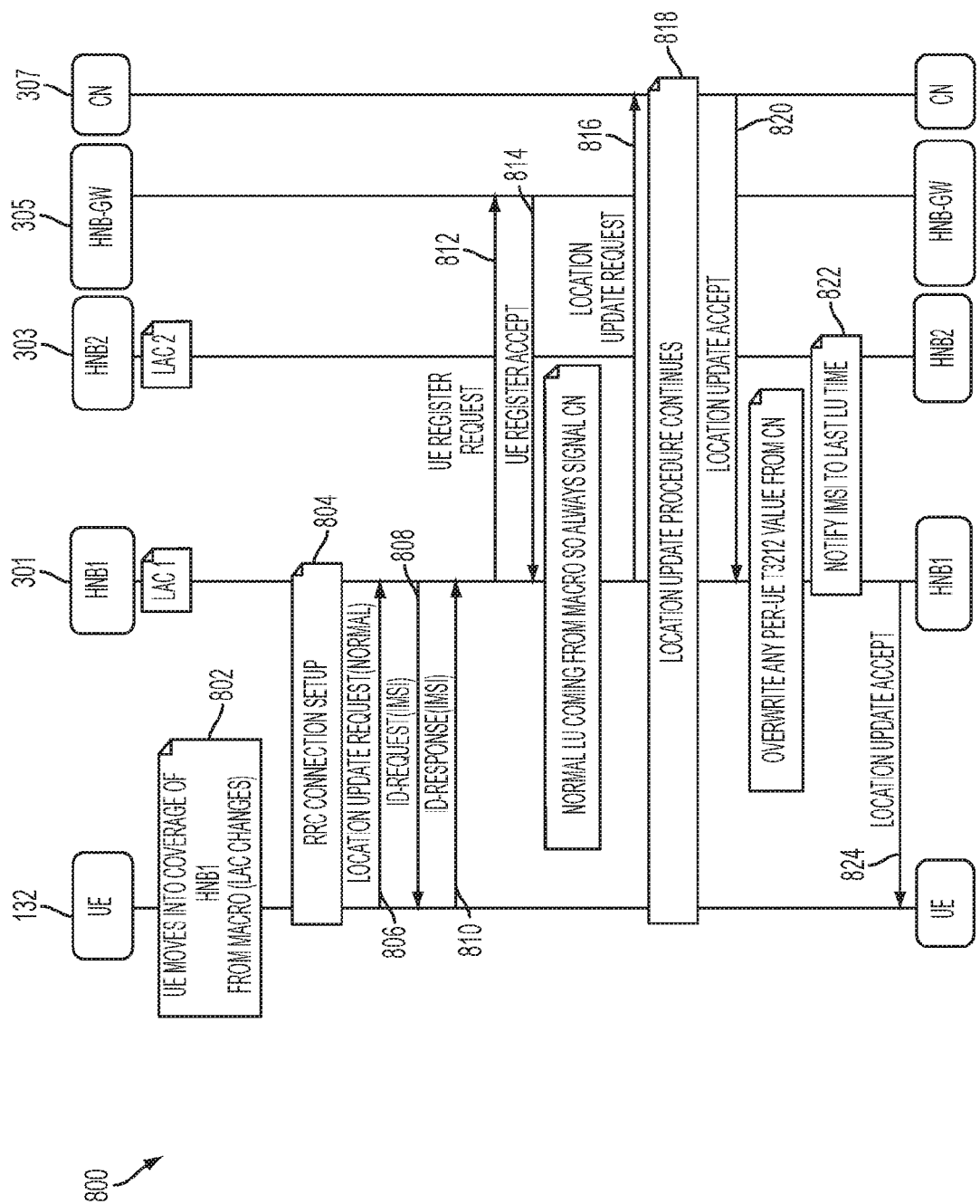
FIG. 8 is a signaling diagram for illustrating an idle mode mobility process using a cluster of Home Node Bs (HNBs) each having a distinct LAC wherein a user equipment (UE) moves into an area covered by an HNB in the cluster for the first time in accordance with certain embodiments.

FIG. 8 is a signaling diagram 800 for illustrating an idle mode mobility process using a cluster of Home Node Bs (HNBs) each having a distinct LAC (e.g., LAC1 for HNB1 301 and LAC2 for HNB2 303) wherein a user equipment (UE) moves into an area covered by an HNB in the cluster for the first time in accordance with certain embodiments. Referring to FIG. 8, UE 132 at 802 moves into an area covered by the cluster for the first time by, e.g., entering the area covered by HNB1 301. In other words, UE 132 moves from an area having one LAC to an area having a different LAC. At 804, an RRC connection is established between UE 132 and HNB1 301. At 806, UE 132 sends a location update request to HNB1 301. In response, HNB1 sends, at 808, an ID request message to UE 132. At 810, UE 132 sends to HNB1 301 an ID response message including a unique IMSI that is associated with UE 132.

At 812, HNB1 301 sends a UE register request to HNB-GW 305. In response, HNB-GW 305 sends, at 814, a UE register accept message to HNB1 301. At 816, HNB1 301 sends a location update request to CN 307, thereby initiating a CN location update procedure between CN 307 and UE 132. At 818, the CN location update procedure continues. At 820, CN 307 sends a location update accept message to HNB1 301, thereby completing the CN location update procedure. Upon receiving the location update accept message, HNB1 301 sends, at 822, to the rest of the HNBs in the cluster a unique IMSI that is associated with UE 132 and a location update (LU) timestamp indicating the time at which the location update accept message is last received. In some embodiments, the IMSI and the LU timestamp are broadcast to the remaining HNBs in the cluster through $I_{URH}$ connections between HNB1 301 and the remaining HNBs in the cluster. At 824, HNB1 301 sends a location update accept message to UE 132.

Figure 9:
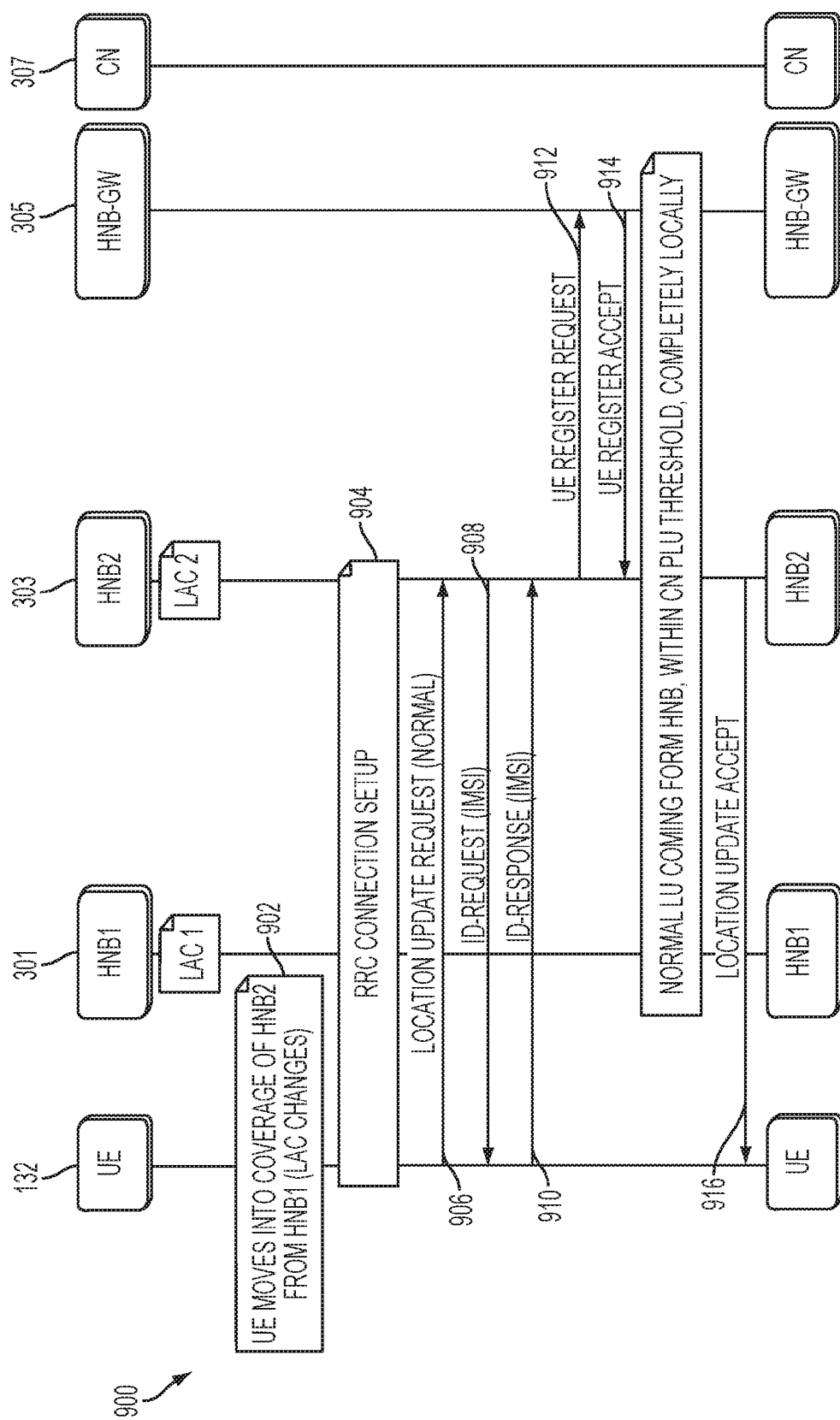
FIG. 9 is a signaling diagram for illustrating an idle mode mobility process using a cluster of Home Node Bs (HNBs) each having a distinct LAC wherein a user equipment (UE) moves into an area covered by a first HNB in the cluster from an area covered by a second HNB in the cluster in accordance with certain embodiments.

FIG. 9 is a signaling diagram 900 for illustrating an idle mode mobility process using a cluster of Home Node Bs (HNBs) each having a distinct LAC wherein a user equipment (UE) moves into the area covered by a first HNB in the cluster from the area covered by a second HNB in the cluster in accordance with certain embodiments. Referring to FIG. 9, UE 132 at 902 leaves the HNB1 coverage area (also referred to as a first Femto cell) and enters an area covered by a neighboring HNB in the cluster (e.g., HNB2 303 coverage area). At 904, an RRC connection is established between UE 132 and HNB2 303. At 906, UE 132 sends a location update request to HNB2 303. In response, HNB2 303 sends, at 908, an ID request message to UE 132. At 910, UE 132 sends to HNB2 303 an ID response message including a unique IMSI that is associated with UE 132.

At 912, HNB2 303 sends a UE registration request to HNB-GW 305. In response, HNB-GW 305 sends, at 914, a UE registration accept message to HNB2 303. Because a location update is performed within the cluster and within a core network (CN) location update (LU) threshold (i.e., the core network periodic timer has not yet expired), HNB2 303 sends, at 916, a location update accept message to UE 132, thereby keeping the location update process completely within the cluster (local location update).

Figure 10:
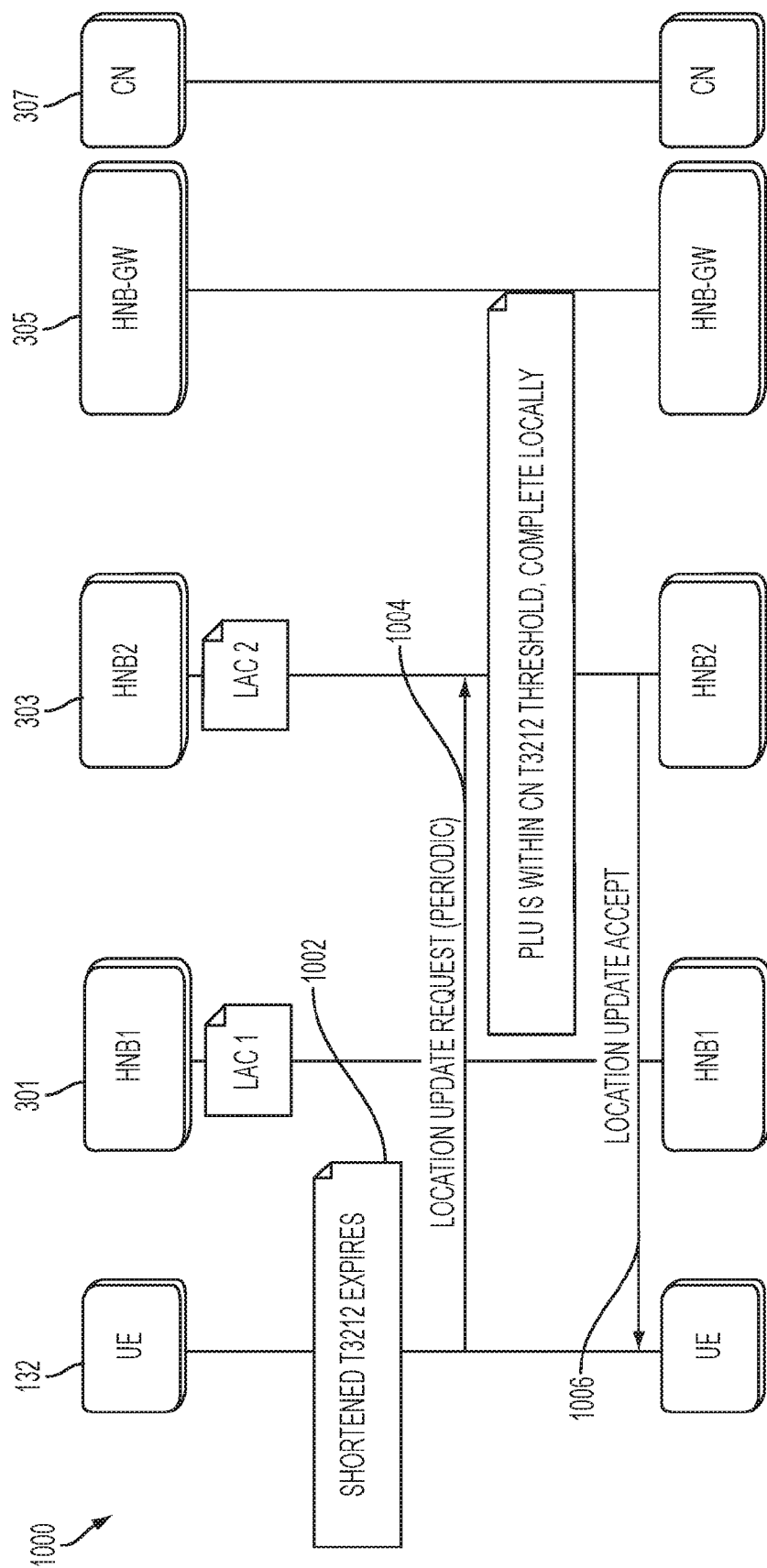
FIG. 10 is a signaling diagram for illustrating an idle mode mobility process using a cluster of Home Node Bs (HNBs) each having a distinct LAC wherein a UE sends a periodic location update request upon expiration of a location update timer within a core network (CN) location update period in accordance with certain embodiments.

FIG. 10 is a signaling diagram 1000 for illustrating an idle mode mobility process using a cluster of Home Node Bs (HNBs) each having a distinct LAC wherein a UE sends a periodic location update request upon expiration of a first location update timer within a core network (CN) location update period (e.g., CN T3212) in accordance with certain embodiments. At 1002, a shortened (e.g., 1 deci-hour or 6 minutes) location update timer (e.g., T3212) associated with UE 132 expires. In response, UE 132 sends, at 1004, a location update request to HNB2 303. Because the shortened location update timer falls within the CN LU threshold (discussed above in connection with FIG. 10), HNB2 303 keeps the location update as a local LU by sending, at 1006, a location update accept message to UE (as opposed to, e.g., initiating a CN location update procedure between UE 132 and CN 307).

Figure 11:
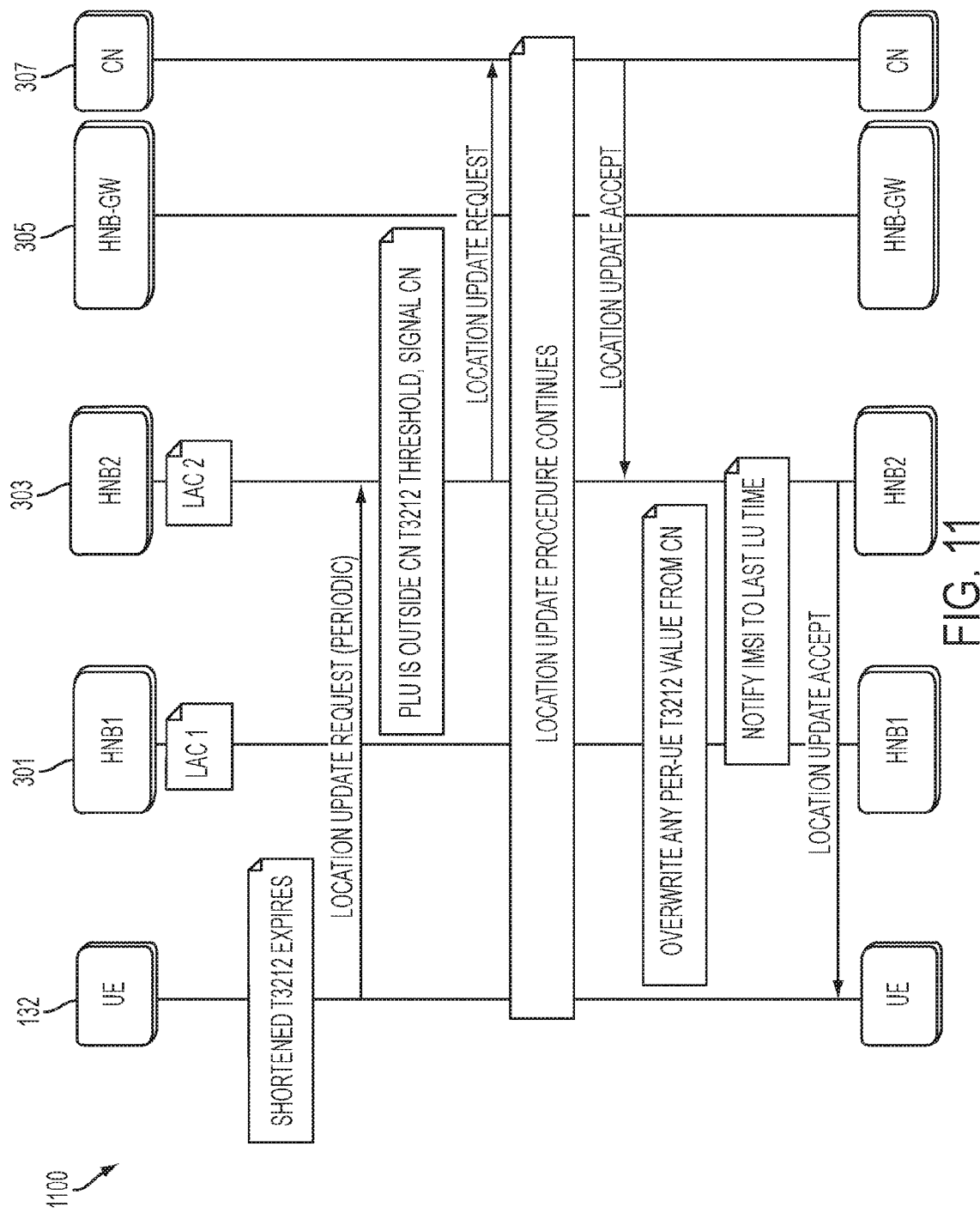
FIG. 11 is a signaling diagram for illustrating an idle mode mobility process using a cluster of Home Node Bs (HNBs) each having a distinct LAC wherein a UE sends a periodic location update request upon expiration of a location update timer outside a core network (CN) location update period in accordance with certain embodiments.

FIG. 11 is a signaling diagram 1100 for illustrating an idle mode mobility process using a cluster of Home Node Bs (HNBs) each having a distinct LAC wherein a UE sends a periodic location update request upon expiration of a first location update timer outside a core network (CN) location update period in accordance with certain embodiments. At 1102, the shortened location update timer (discussed above in connection with 1002 in FIG. 11) expires again. In response, UE 132 sends, at 1104, a location update request to HNB2 303 (the HNB that is currently hosting UE 132). Because the shortened LU timer falls outside the CN LU threshold (i.e., the core network periodic timer has expired), HNB2 303 sends, at 1106, a location update request to CN 307, initiating a CN location update procedure between UE 132 and CN 307.

At 1108, the CN location update procedure continues. At 1110, CN 307 sends a location update accept message to HNB2 303, thereby completing the CN LU procedure. The shortened LU timer is reset and, at 1112, HNB2 303 sends a unique IMSI that is associated with UE 132 and the updated LU timestamp to the remaining HNBs in the cluster. In some embodiments, the IMSI and the updated LU timestamp are broadcast to the remaining HNBs in the cluster through an $I_{URH}$ connection between HNB1 301 and each remaining HNBs in the cluster.

Figure 12:
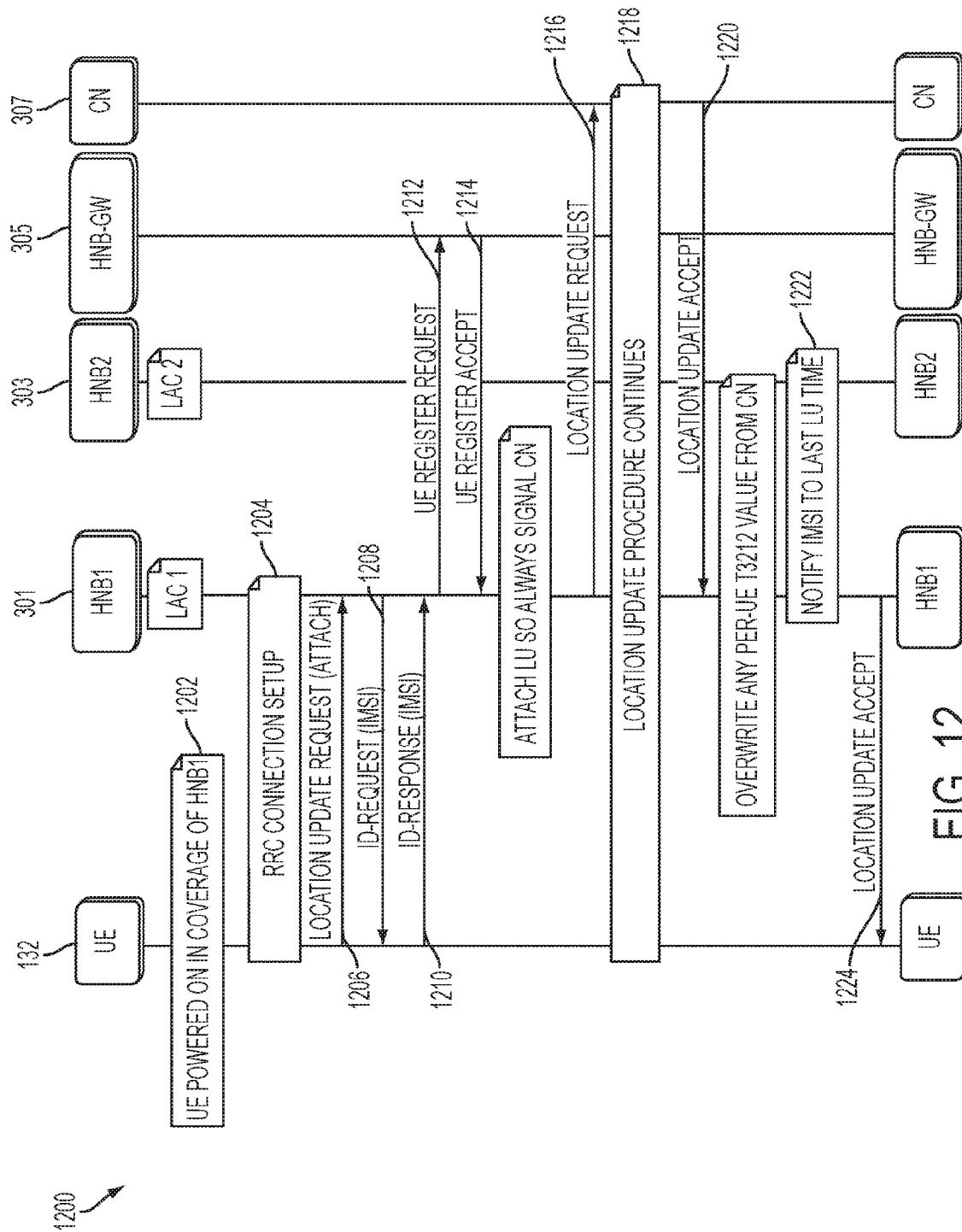
FIG. 12 is a signaling diagram for illustrating an idle mode mobility process using a cluster of Home Node Bs (HNBs) each having a distinct LAC wherein a UE is powered up from an area covered by an HNB in the cluster in accordance with certain embodiments.

FIG. 12 is a signaling diagram 1200 for illustrating an idle mode mobility process using a cluster of Home Node Bs (HNBs) each having a distinct LAC wherein a UE is powered up from an area covered by an HNB in the cluster in accordance with certain embodiments. At 1202, UE 132 is powered up in an area that is covered by HNB1 301. At 1204, an RRC connection is established between UE 132 and HNB1 301. At 1206, UE 132 sends a location update request to HNB1 301. Since the UE 132 is being powered on for the first time in the area covered by HNB1 301, the location update request is an "attach" location update, and is not a "normal" or "periodic" update (i.e., the location update is triggered not through the expiration of a periodic timer or counter, but because the UE 132 is "attaching" to the network). In response, HNB1 301 sends, at 1208, an ID request message to UE 132. At 1210, UE 132 sends to HNB1 301 an ID response including a unique IMSI that is associated with UE 132.

At 1212, HNB1 301 sends a UE registration request to HNB-GW 305. In response, HNB-GW 305 sends, at 1214, a UE registration accept message to HNB1 301. Because UE 132 is just powered up, HNB1 301 initiates a CN location update procedure by sending, at 1216, a location update request to CN 307. At 1218, the CN location update procedure is carried out by UE 132 and CN 307. At 1220, CN 307 sends a location update accept message, thereby completing the CN location update procedure. At 1222, HNB1 301 sends the IMSI associated with UE 132 and the updated LU timestamp to the remaining HNBs in the cluster. In some embodiments, the IMSI and the updated LU timestamp are broadcast to the remaining HNBs in the cluster through an $I_{URH}$ connection between HNB1 301 and each remaining HNBs in the cluster. At 1224, HNB1 301 sends a location update accept message to UE 132.

Figure 13:
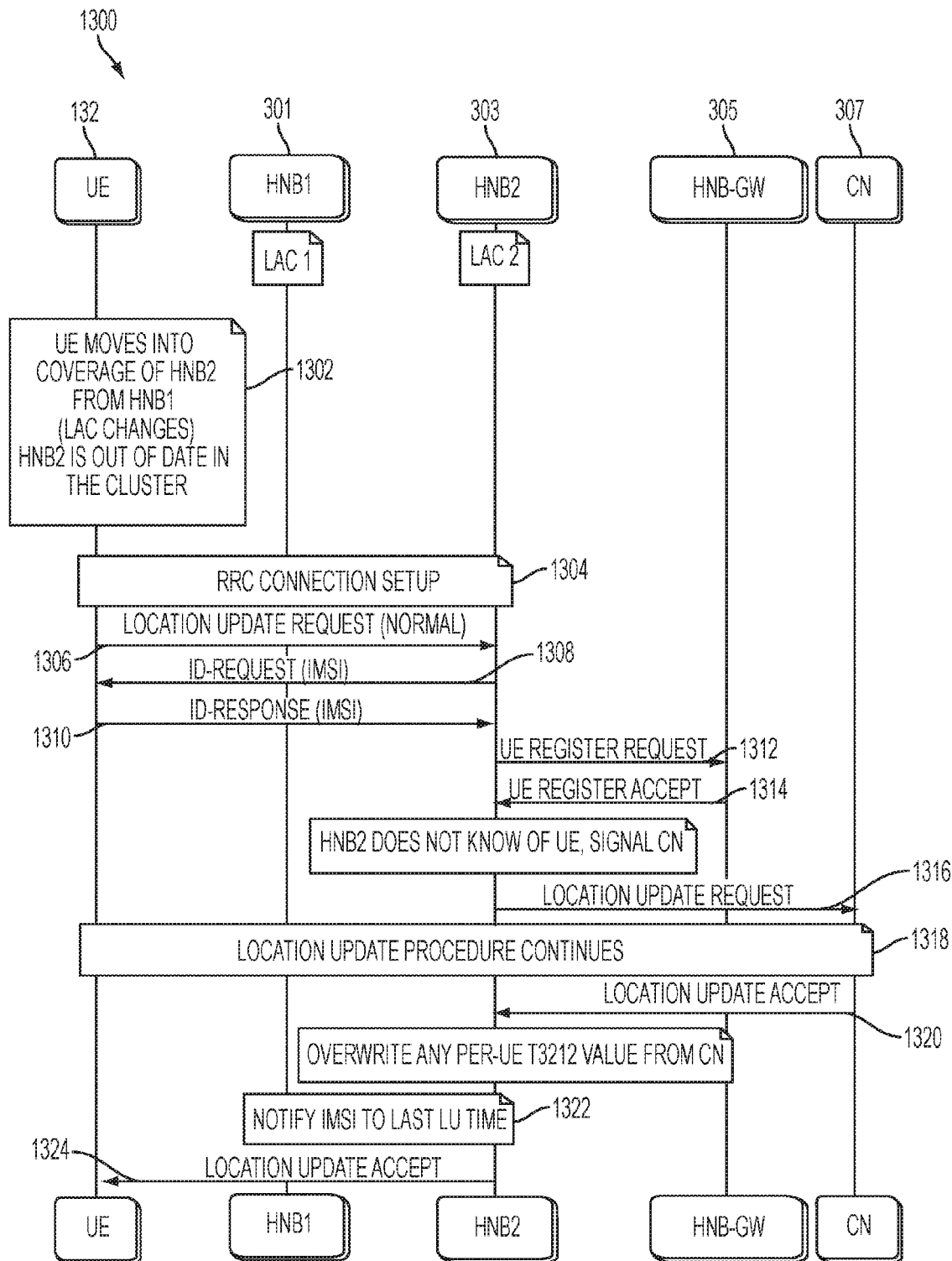
FIG. 13 is a signaling diagram for illustrating an idle mode mobility process using a cluster of Home Node Bs (HNBs) each having a distinct LAC wherein a UE moves into an area covered by an HNB in the cluster and wherein the HNB has missed some cluster communications in accordance with certain embodiments.

FIG. 13 is a signaling diagram 1300 for illustrating an idle mode mobility process using a cluster of Home Node Bs (HNBs) each having a distinct LAC wherein a UE moves into an area covered by an HNB in the cluster and wherein the HNB has missed some cluster communications in accordance with certain embodiments. At 1302, UE 132 moves from the HNB1 coverage area to an area that is covered by HNB2 303. However, HNB2 303 is not up to date with the message traffics in the cluster. For instance, HNB2 303 may not be aware that UE 132 entered an area covered by the cluster (e.g., the HNB1 coverage area) or that UE 132 is from the HNB1 coverage area.

At 1304, an RRC connection is established between UE 132 and HNB2 303. At 1306, UE 132 sends a location update request to HNB2 303. In response, HNB2 303 sends, at 1308, an ID request message to UE 132. At 1310, UE 132 sends to HNB2 303 an ID response including a unique IMSI that is associated with UE 132. At 1312, HNB2 303 sends a UE registration request to HNB-GW 305. In response, HNB-GW 305 sends, at 1314, a UE registration accept message to HNB2 303.

Because HNB2 303 is not up to date with, e.g., due to the message traffic within the cluster, HNB2 303 does not know of UE 132. To HNB2 303, thus, it is as though UE 132 is just powered up or as though UE 132 just moved into the cluster coverage area. Therefore, HNB2 303 initiates a CN location update procedure by sending, at 1316, a location update request to CN 307. At 1318, the CN location update procedure is carried out by UE 132 and CN 307. At 1320, CN 307 sends a location update accept message to HNB2 303.

At 1322, HNB2 303 sends the IMSI associated with UE 132 and the updated LU timestamp to the remaining HNBs in the cluster. In some embodiments, the IMSI and the updated LU timestamp are broadcast to the remaining HNBs in the cluster through an $I_{URH}$ connection between HNB2 303 and each remaining HNBs in the cluster. At 1324, HNB2 303 sends a location update accept message to UE 132.

Figure 14:
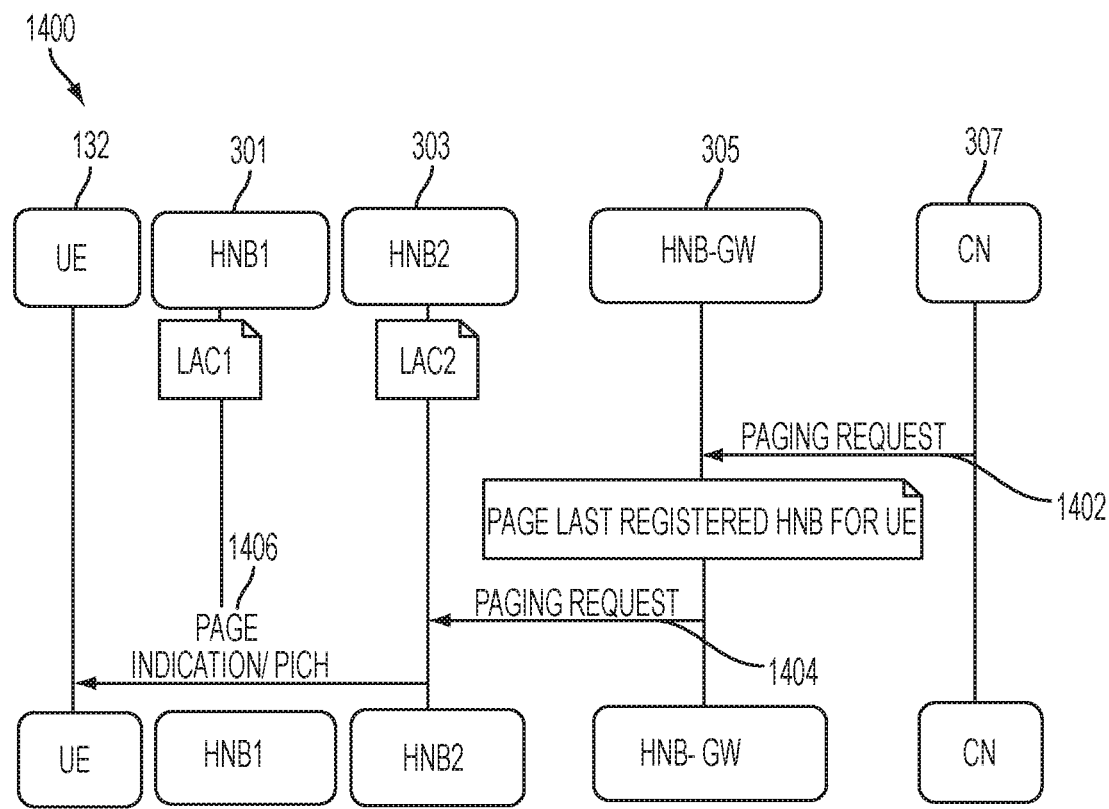
FIG. 14 is a signaling diagram for illustrating a handling of a paging request from the core network (CN) for an idle mode mobility process using a cluster of Home Node Bs (HNBs) each having a distinct LAC in accordance with certain embodiments.

FIG. 14 is a signaling diagram 1400 for illustrating a handling of a paging request from the core network (CN) for an idle mode mobility process using a cluster of Home Node Bs (HNBs) each having a distinct LAC in accordance with certain embodiments. At 1402, CN 307 sends a paging request for UE 132 to HNB-GW 305. At 1404, HNB-GW 305 forwards the page request to the HNB that is last known for hosting UE 132 (HNB2 303). At 1406, HNB2 303 pages UE 132.

Regarding FIGS. 8-14, a multi-LAC configuration is used at the access point (AP) layer to address, e.g., the additional mobility load to the HNB-GW and CN. UE registrations are utilized to determine whether a UE is coming from within a same cluster. If the UE comes from within the same cluster, a complete location update procedure is carried out locally at the AP.

There exists multiple indoor access point (AP) deployment models. They are: a residential model, a small-office-home-office (SOHO) model, a HotSpot model and a cluster model. The cluster model is used for enterprises, shopping malls, transport stations, etc. A cluster can be used in a building where users can enter through a few entrances and, once inside, are contained. Once users are inside the building, they could roam between APs up to seven times per hour. Access points (APs) are managed by a same HMS and access a same HNB-GW.

The core network (CN) requires periodic location updates (e.g., every 7 deci-hours or 42 minutes). Because APs complete locations updates locally, the cluster state is managed to determine when to complete the location update with the CN by (1) configuring separate values for the CN periodic location update timer (e.g., 42 minutes), also referred to as macro LU timer, and over-the-air periodic timer (e.g., 6 minutes), also referred to as location LU timer, (2) notifying (e.g., using GRID or XMPP) other cluster members (HNBs) of every registered IMSI (UE) and time of last location update to CN, and (3) forwarding LU to CN when receiving periodic/normal LU if within (CN LU timer−AP LU timer).

User Equipment and Network Device

Figure 15:
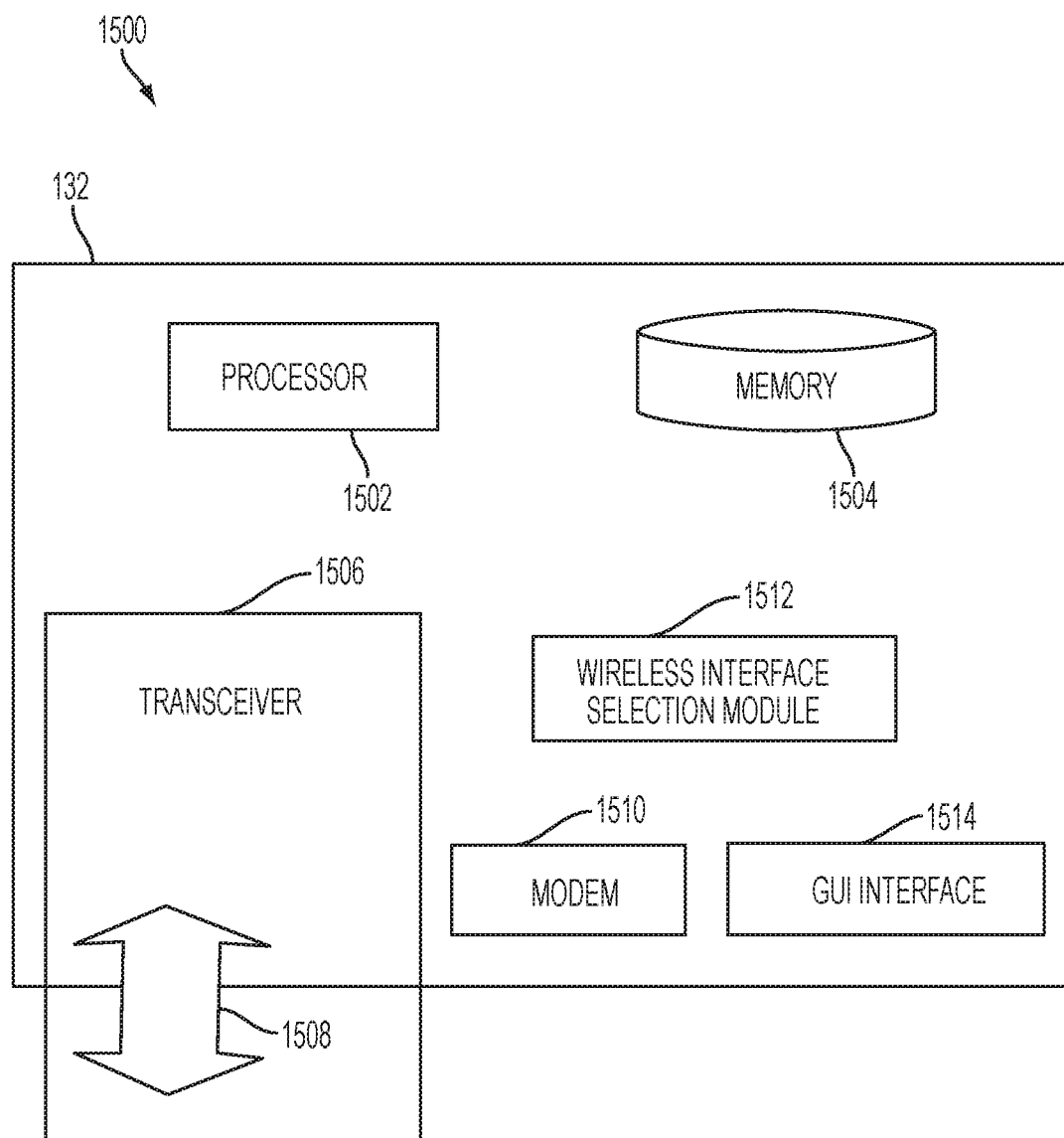
FIG. 15 shows a logical diagram of a user equipment in accordance with certain embodiments.

FIG. 15 illustrates a logical view 1500 of user equipment (UE) 132 in accordance with certain embodiments. The UE 132 can include a processor 1502, a memory 1504, a transceiver 1506 including an interface 1508, a modem 1510, a wireless interface selection module 1512, and a GUI interface 1514.

The transceiver 1506 includes a transmitter and a receiver. The transmitter and the receiver can be integrated into a single chip or can be embodied in separate chips. The transceiver 1506 can also include an interface 1508 that provides an input and/or output mechanism to communicate with other network devices. The interface 1508 can measure the wireless signal strengths of wireless interfaces such as base stations and access points. The interface 1508 can be implemented in hardware to send and receive signals in a variety of mediums, such as optical, copper, and wireless, and in a number of different protocols some of which may be non-transient.

The modem 1510 is configured to implement modulation and framing of signals according to one or more communication standards. The communication standards include the cellular standards defined under 3GPP.

The wireless interface selection module 1512 is configured to select a wireless interface from which to receive network services. The wireless interfaces can include interfaces to different types of communication networks, including cellular networks and WLANs. Cellular networks can include LTE networks. A wireless interface for LTE networks can include a base station such as an eNodeB; a wireless interface for WLANs can include an access point.

The wireless interface selection module 1512 can select the serving wireless interface by analyzing data load information associated with wireless interfaces. In certain embodiments, the wireless interface selection module 1512 can be configured to attach to a wireless interface handling the least amount of data traffic and/or with more available resources. In certain embodiments, the wireless interface selection module 1512 can also analyze additional information to decide to which wireless interface to connect. For example, the wireless interface selection module 1512 can use one or more of the following: the load condition associated with the candidate wireless interfaces, the wireless signal strength associated with the candidate wireless interfaces, and a configuration status on the wireless interface selection module 1512 indicating whether the UE 132 favors the cellular network or the WLAN.

The wireless interface selection module 1512 can be implemented in software using memory 1504 such as a non-transitory computer readable medium, a programmable read only memory (PROM), or flash memory. The software can run on a processor 1502 that executes instructions or computer code. The wireless interface selection module 1512 may also be implemented in hardware using an application specific integrated circuit (ASIC), programmable logic array (PLA), or any other integrated circuit.

The GUI interface 1514 can provide communication with an input and/or output mechanism to communicate with UE users. UE users can use input/output devices to send/receive data to/from the UE 132 over the GUI interface 1514. Input/output devices can include, but are not limited to, a keyboard, a screen, a touch screen, a monitor, and a mouse. The GUI interface 1514 can operate under a number of different protocols. The GUI interface 1514 can be implemented in hardware to send and receive signals in a variety of mediums, such as optical, copper, and wireless.

The UE 132 described above can communicate with a plurality of radio access networks using a plurality of access technologies and with wired communication networks. The UE 132 can be a smart phone offering advanced features and capabilities, such as word processing, web browsing, gaming, e-book capabilities, an operating system, and a full keyboard. The UE 132 may run an operating system such as Symbian OS, iPhone OS, RIM's Blackberry, Windows Mobile, Linux, Palm WebOS, and Android. The screen may be a touch screen that can be used to input data to the UE 132 and the touch screen can be used instead of the full keyboard. The UE 132 may have the capability to run applications or communicate with applications that are provided by servers in the communication network. The UE 132 can receive updates and other information from these applications on the network.

The UE 132 also encompasses many other devices such as televisions (TVs), video projectors, set-top boxes or set-top units, digital video recorders (DVR), computers, netbooks, laptops, and any other audio/visual equipment that can communicate with a network. The UE 132 can also keep global positioning coordinates, profile information, or other location information in its stack or memory. The UE 132 can have a memory such as a computer readable medium, flash memory, a magnetic disk drive, an optical drive, a programmable read-only memory (PROM), and/or a read-only memory (ROM). The UE 132 can be configured with one or more processors 1502 that process instructions and run software that may be stored in memory 1504. The processor 1502 can also communicate with the memory 1504 and interfaces to communicate with other devices. The processor 1502 can be any applicable processor such as a system-on-a-chip that combines a CPU, an application processor, and flash memory. The interfaces can be implemented in hardware or software. The interfaces can be used to receive both data and control information from the network as well as local sources, such as a remote control to a television. The UE 132 can also provide a variety of user interfaces (e.g., GUI Interface 1514) such as a keyboard, a touch screen, a trackball, a touch pad, and/or a mouse. The UE 132 may also include speakers and a display device in some embodiments.

Any of the network components specified in this disclosure, such as small cells, small cell gateways, and mobility servers, can be implemented, at least in part, in a network device in some embodiments. This network device can implement multiple and different integrated functionalities. In some embodiments, one or more of the following additional functionalities can be implemented on the network device including a security gateway (SeGW), an access gateway, a Gateway General packet radio service Serving Node (GGSN), a serving GPRS support node (SGSN), a packet data inter-working function (PDIF), an access service network gateway (ASNGW), a User Plane Entity (UPE), an IP Gateway, a session initiation protocol (SIP) server, a proxy-call session control function (P-CSCF), and an inter-rogating-call session control function (I-CSCF), a serving gateway (SGW), and a packet data network gateway (PDN GW), a mobility management entity (MME), a mobility access gateway (MAG), an HRPD serving gateway (HSGW), a local mobility anchor (LMA), a packet data serving node (PDSN), a foreign agent (FA), and/or home agent (HA). The CVR scheme can be implemented on network devices of the same type, implementing the same set of functionalities.

In certain embodiments, the functionalities are provided by a combination of hardware and software in the network device. General purpose hardware can be configured in the network device to provide one or more of these specialized functionalities. If the network device is serving as a small cell gateway or a mobility server, the network device can provide trigger based traffic management during a handoff from a Femto base station to a macro base station, while maintaining traffic management for the mobile node. The offload gateway can be implemented as any combination of the following including an xGSN, an xGW, an xGW-SGW, and an xGW-PGW.

Figure 16:
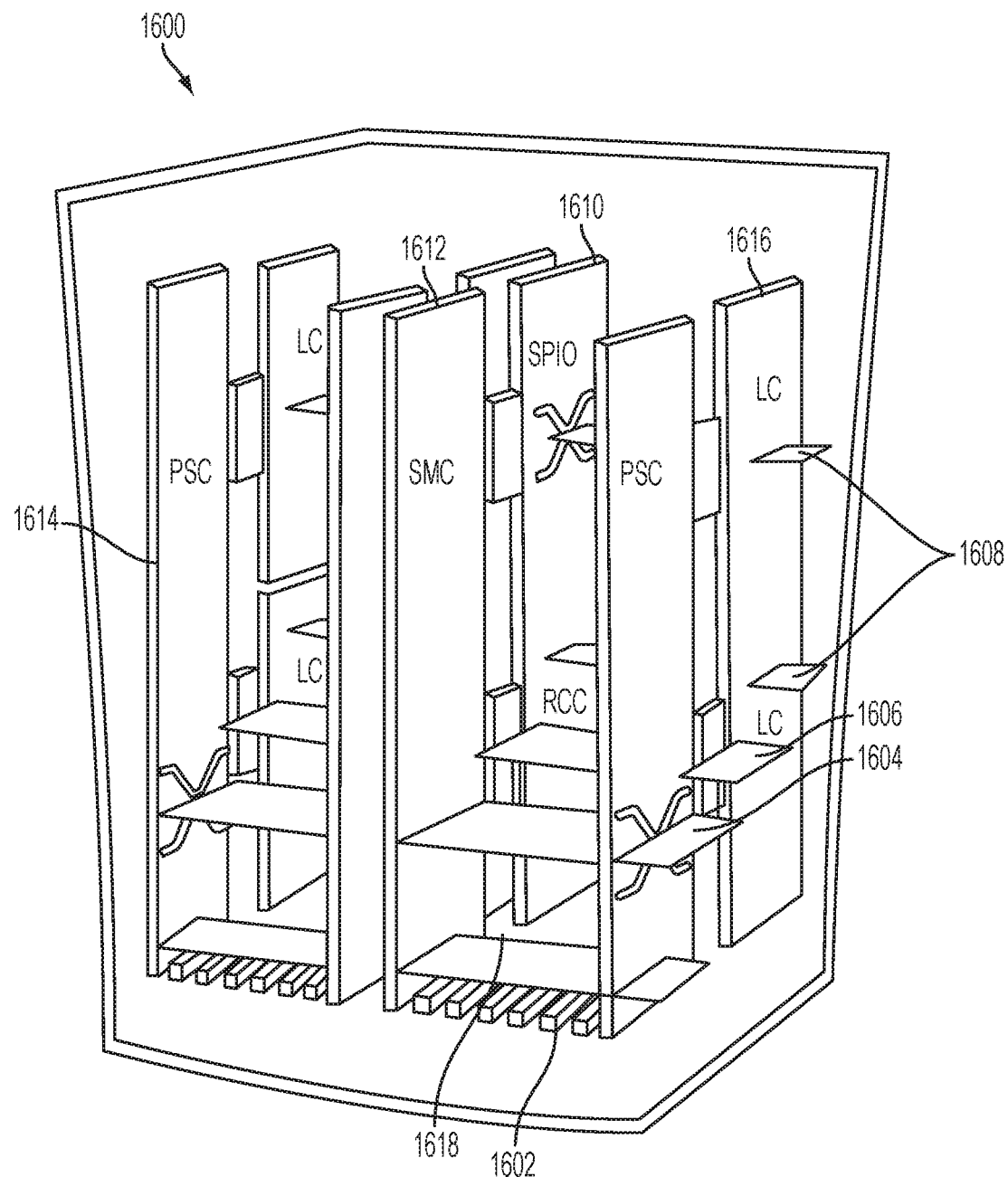
FIG. 16 illustrates a network device in accordance with certain embodiments.

In some embodiments the network device is implemented using a collection of integrated circuit boards or cards. These cards include input/output interfaces for communication amongst each other, at least one processor for executing instructions and running modules that are stored in memory, and memory for storing data. The features of a network device that implements a gateway, in accordance with some embodiments, are further described below. FIG. 16 illustrates the implementation of a network device 1600 in accordance with some embodiments. The network device 1600 includes slots 1602 for loading application cards and line cards. A midplane can be used in the network device 1600 to provide intra-network device communications, power connections, and transport paths between the various installed cards. The midplane can include buses such as a switch fabric 1604, a control bus 1606, a system management bus, a redundancy bus 1608, and a time division multiplex (TDM) bus. The switch fabric 1604 is an IP-based transport path for user data throughout the network device 1600 implemented by establishing inter-card communications between application cards and line cards. The control bus 1606 interconnects the control and management processors within the network device 1600. The network device management bus provides management of system functions such as supplying power, monitoring temperatures, board status, data path errors, card resets, and other failover features. The redundancy bus 1608 provides transportation of user data and redundancy links in the event of hardware failures. The TDM bus provides support for voice services on the system.

The network device 1600 supports at least four types of application cards: a switch processor I/O card (SPIO) 1610, a system management card (SMC) 1612, a packet service card (PSC) 1614, and a packet accelerator card (not shown). Other cards used in the network device 1600 include line cards 1616 and redundant crossbar cards (RCC) 1618. The line cards 1616, when loaded in the network device 1600, provide input/output connectivity to the network and other devices, as well as redundancy connections. The line cards 1616 include interfaces to the network through Ethernet, Fiber Optic, and/or any other communication mediums. The redundant crossbar card (RCC) 1618 includes a non-blocking crossbar and connections to each of the cards in the network device 1600. This allows a redundant connection to be made through the redundant crossbar card 1618 from any one card to any other card in the network device 1600. The SPIO card 1610 serves as a controller of the network device 1600 and is responsible for such things as initializing the network device 1600 and loading software configurations onto other cards in the network device 1600.

The system management card (SMC) 1612 and switch processor card (not shown) are system control and management cards for managing and controlling other cards in the network device 1600. The packet accelerator card (PAC) and packet service card (PSC) 1614 provide packet processing, context processing capabilities, and forwarding capabilities among other things. The PAC and PSC 1614 perform packet-processing operations through the use of control processors and a network processing unit. The network processing unit determines packet processing requirements;

receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing.

The operating system software can be based on a Linux software kernel and run specific applications in the network device 1600 such as monitoring tasks and providing protocol stacks. The software allows network device resources to be allocated separately for control and data paths. For example, certain packet accelerator cards and packet services cards can be dedicated to performing routing or security control functions, while other packet accelerator cards/packet services cards are dedicated to processing user session traffic. As network requirements change, hardware resources can be dynamically deployed to meet the requirements in some embodiments. The system can be virtualized to support multiple logical instances of services, such as technology functions (e.g., a SeGW PGW, SGW, MME, HSGW, PDSN, ASNGW, PDIF, HA, or GGSN).

The software in the network device 1600 can be divided into a series of tasks that perform specific functions. These tasks communicate with each other as needed to share control and data information throughout the network device 1600. A task is a software process that performs a specific function related to system control or session processing. Three types of tasks operate within the network device 1600 in some embodiments: critical tasks, controller tasks, and manager tasks. The critical tasks control functions that relate to the ability of the network device 1600 to process calls such as network device initialization, error detection, and recovery tasks. The controller tasks mask the distributed nature of the software from the user and perform tasks such as monitoring the state of subordinate manager(s), providing for intra-manager communication within the same subsystem, and enabling inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a network device (e.g., network device 1600) include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the network device by monitoring the various software and hardware components of the network device. Recovery control task subsystem is responsible for executing a recovery action for failures that occur in the network device and receives recovery actions from the high availability task subsystem. Processing tasks are distributed into multiple instances running in parallel so if an unrecoverable software fault occurs, the entire processing capabilities for that task are not lost.

User session processes can be sub-grouped into collections of sessions so that if a problem is encountered in one sub-group users in another sub-group will not be affected by that problem.

The architecture also allows check-pointing of processes, which is a mechanism to protect the system against any critical software processes that may fail. The self-healing attributes of the software architecture protects the system by anticipating failures and instantly spawning mirror processes locally or across card boundaries to continue the operation with little or no disruption of service. This unique architecture allows the system to perform at the highest level of resiliency and protects the user's data sessions while ensuring complete accounting data integrity.

Shared configuration task subsystem provides the network device with an ability to set, retrieve, and receive notification of network device configuration parameter changes and is responsible for storing configuration data for the applications running within the network device. A resource management subsystem is responsible for assigning resources (e.g., processor and memory capabilities) to tasks and for monitoring the task's use of the resources.

Virtual private network (VPN) subsystem manages the administrative and operational aspects of VPN-related entities in the network device, which include creating separate VPN contexts, starting IP services within a VPN context, managing IP pools and subscriber IP addresses, and distributing the IP flow information within a VPN context. In some embodiments, within the network device, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards.

The session subsystem is responsible for processing and monitoring a mobile subscriber's data flows in some embodiments. Session processing tasks for mobile data communications include: S1/S5/S8 interface termination for LTE networks, A10/A11 interface termination for CDMA networks, GSM tunneling protocol (GTP) termination for GPRS and/or UMTS networks, asynchronous PPP processing, IPsec, packet filtering, packet scheduling, Diffserv codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In providing emulation, as MIPv4 is received from a mobile node (e.g., user equipment 132), the session subsystem can setup a MIPv4 termination and setup a PMIPv6 session towards the core network. A session manager can track the mapping of the sessions and processing to provide the emulation and inter-working between the networks. A database can also be used to map information between the sessions, and store, for example, NAI, HoA, AE information in some embodiments.

Figure 17:
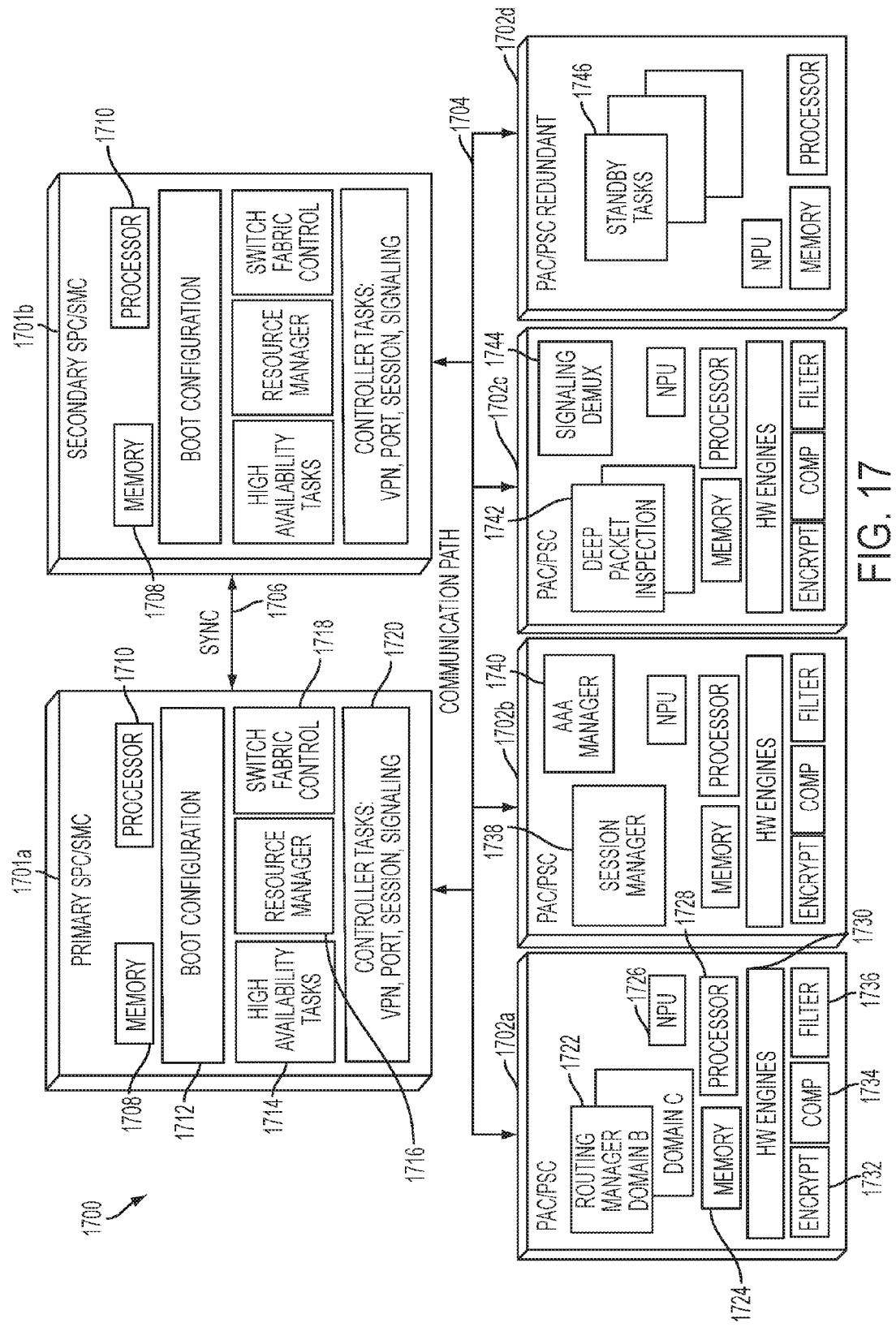
FIG. 17 illustrates a logical view of the software architecture of a network device in accordance with certain embodiments.

The network device allows system resources to be allocated separately for control and data paths. For example, certain PACs/PSCs could be dedicated to performing routing or security control functions while other PACs/PSCs are dedicated to processing user session traffic. As network requirements grow and call models change, hardware resources can be added to accommodate processes, such as encryption, packet filtering, etc., that require more processing power. FIG. 17 illustrates a logical view 1700 of the software architecture of a network device (e.g., network device 1600) in accordance with certain embodiments. As shown, the software and hardware can be distributed within the network device and across different circuit boards, processors, and memory. FIG. 17 includes a primary switch processor card (SPC)/system management card (SMC) 1701a, a secondary SPC/SMC 1701b, PAC/PSC 1702a-1702d, a communication path 1704, and a synchronization path 1706. The primary SPC/SMC 1701a and the secondary SPC/SMC 1701b each includes a memory 1708, a processor 1710, a boot configuration 1712, high availability tasks 1714, resource manager 1716, switch fabric control 1718, and controller tasks 1720.

The SPC/SMC 1701 manages and controls the network device including the other cards in the network device. The SPC/SMC 1701 can be configured in a primary and secondary arrangement that provides redundancy and failsafe protection. The modules or tasks running on the SPC/SMC 1701 are related to network device wide control and management. The boot configuration task 1712 includes information for starting up and testing the network device. The network device can also be configured to startup in different configurations and providing different implementations. These can include which functionalities and services are capable of running on the SPC/SMC 1701. The high availability task 1714 maintains the operational state of the network device by monitoring the device and managing recovery efforts to avoid disruption of service. The resource manager tracks and assigns the available resources for sessions and demands on the network device. This can include load balancing among different processors and tasks running on the network device. Processes can be distributed across the system to fit the needs of the network model and specific process requirements. For example, most tasks can be configured to execute on SPC/SMC 1701 or a PAC/PSC 1702, while some processor intensive tasks can also be performed across multiple PACs/PSCs to utilize multiple CPU resources. Distribution of these tasks is invisible to the user. The switch fabric control 1718 controls the communication paths in the network device. The controller tasks module 1720 can manage the tasks among the resources of the networks to provide, for example, VPN services, assign ports, and create, delete, and modify sessions for UE 132.

The PAC/PSC 1702 is a high-speed processing card that is designed for packet processing and the tasks involved with providing various network functionalities on the network device. The PAC/PSC 1702 include a memory 1724, a network processing unit (NPU) 1726, a processor 1728, a hardware engine 1730, an encryption component 1732, a compression component 1734, and a filter component 1736. Hardware engines 1730 can be deployed with the card to support parallel distributed processing for compression, classification traffic scheduling, forwarding, packet filtering, and statistics compilations. The components can provide specialize processing that can be done more efficiently than using a general processor in some embodiments.

Each PAC/PSC 1702 is capable of supporting multiple contexts. The PAC/PSC 1702 is also capable of running a variety of tasks or modules. PAC/PSC 1702a provides routing managers 1722 with each covering routing of a different domain. PAC/PSC 1702b provides a session manager 1738 and an AAA manager 1740. The session manager 1738 manages one or more sessions that correspond to one or more UE 132. A session allows a UE 132 to communicate with the network for voice calls and data. The AAA manager 1740 manages accounting, authentication, and authorization with an AAA server in the network. PAC/PSC 1702 provides a DPI task 1742 and a signaling demux 1744. The DPI task 1742 provides inspection of packet information beyond layer 4 for use and analysis by the network device. The signaling demux 1744 can provide scalability of services in combination with other modules. PAC/PSC 1702d provides redundancy through standby tasks 1746. Standby tasks 1746 store state information and other task information so that the standby task can immediately replace an active task if a card fails or if there is a scheduled event to remove a card.

In some embodiments, the software needed for implementing a process or a database includes a high level procedural or an object-orientated language such as C, C++, C#, Java, or Perl. The software may also be implemented in assembly language if desired. Packet processing implemented in a network device can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Other embodiments are within the following claims. For example, different types of UEs can be used.

What is claimed is:

1. A method comprising:
    receiving, at a first small cell, a message including a mobility area update request from a user equipment (UE);
    determining, based on at least the mobility area update request, whether to initiate a core network update or a local update;
    initiating the determined core network update or the local update;
    sending to the UE, based on whether a core network update or a local update is initiated, a core network-generated mobility area update accept message or a locally generated mobility area update accept message; and
    sending a local periodic timer to the UE instructing the UE to send another mobility area update request when the local periodic timer expires.

2. The method of claim 1, wherein the core network update is initiated in response to a determination that the mobility area update request from the UE is received at the first small cell for a first time after the UE moves into a preconfigured cluster area covered by a plurality of small cells from a preconfigured cluster of small cells, wherein the first small cell is one of the preconfigured cluster of small cells.

3. The method of claim 1, wherein the core network update is initiated in response to a determination that a core network periodic timer has expired.

4. The method of claim 1, wherein a core network update is initiated in response to a determination that the mobility area update request from the UE is received at the first small cell for the first time after the UE is turned on.

5. The method of claim 1, wherein initiating the core network update comprises forwarding the mobility area update request to a core network via a small cell gateway.

6. The method of claim 5, further comprising:
receiving the core network-generated mobility area update accept message from the core network in response to the mobility area update request; and
updating a core network periodic timer for the UE in a mobility server with a time at which the core network-generated mobility area update accept message was received.

7. The method of claim 1, wherein initiating the local update comprises:
generating the locally-generated mobility area update accept message in response to the mobility area update request; and
updating location information of the UE with a mobility server.

8. An apparatus comprising:
a memory to store data;
at least one processor to:
receive, at a first small cell, a message including a mobility area update request from a user equipment (UE);
determine, based on at least the mobility area update request, whether to initiate a core network update or a local update;
initiate the determined core network update or the local update;
send to the UE, based on whether a core network update or a local update is initiated, a core network-generated mobility area update accept message or a locally generated mobility area update accept message; and
send a local periodic timer to the UE instructing the UE to send another mobility area update request when the local periodic timer expires.

9. The apparatus of claim 8, wherein the core network update is initiated in response to a determination that the mobility area update request from the UE is received at the first small cell for a first time after the UE moves into a preconfigured cluster area covered by a plurality of small cells from a preconfigured cluster of small cells, wherein the first small cell is one of the preconfigured cluster of small cells.

10. The apparatus of claim 8, wherein the core network update is initiated in response to a determination that a core network periodic timer has expired.

11. The apparatus of claim 8, wherein a core network update is initiated in response to a determination that the mobility area update request from the UE is received at the first small cell for the first time after the UE is turned on.

12. The apparatus of claim 8, wherein initiating the core network update comprises forwarding the mobility area update request to a core network via a small cell gateway.

13. The apparatus of claim 12, the at least one processor further to:
receive the core network-generated mobility area update accept message from the core network in response to the mobility area update request; and
update a core network periodic timer for the UE in a mobility server with a time at which the core network-generated mobility area update accept message was received.

14. The apparatus of claim 8, wherein initiating the local update comprises:
generating the locally-generated mobility area update accept message in response to the mobility area update request; and
updating location information of the UE with a mobility server.

15. At least one non-transitory computer readable media comprising logic that when executed is operable to:
receive, at a first small cell, a message including a mobility area update request from a user equipment (UE);
determine, based on at least the mobility area update request, whether to initiate a core network update or a local update;
initiate the determined core network update or the local update;
send to the UE, based on whether a core network update or a local update is initiated, a core network-generated mobility area update accept message or a locally generated mobility area update accept message; and
send a local periodic timer to the UE instructing the UE to send another mobility area update request when the local periodic timer expires.

16. The at least one media of claim 15, wherein the core network update is initiated in response to a determination that the mobility area update request from the UE is received at the first small cell for a first time after the UE moves into a preconfigured cluster area covered by a plurality of small cells from a preconfigured cluster of small cells, wherein the first small cell is one of the preconfigured cluster of small cells.

17. The at least one media of claim 15, wherein the core network update is initiated in response to a determination that a core network periodic timer has expired.

18. The at least one media of claim 15, wherein a core network update is initiated in response to a determination that the mobility area update request from the UE is received at the first small cell for the first time after the UE is turned on.

19. The at least one media of claim 15, wherein initiating the core network update comprises forwarding the mobility area update request to a core network via a small cell gateway.

20. The at least one media of claim 15, wherein initiating the local update comprises:
generating the locally-generated mobility area update accept message in response to the mobility area update request; and
updating location information of the UE with a mobility server.

* * * * *